(12) United States Patent
Neumann et al.

(10) Patent No.: US 10,744,650 B2
(45) Date of Patent: Aug. 18, 2020

(54) MOBILE ROBOTS WITH INTELLIGENT CAPACITIVE TOUCH SENSING

(71) Applicant: iRobot Corporation, Bedford, MA (US)

(72) Inventors: Rogelio Manfred Neumann, Somerville, MA (US); Landon Unninayar, Waltham, MA (US); Fangzheng Guo, Arlington, MA (US); Qingtai Zhai, West Roxbury, MA (US); John P. O'Brien, Newton, MA (US); Benjamin H. Schriesheim, Somerville, MA (US); Travis Gschrey, Billerica, MA (US); Milan Modh, Waltham, MA (US)

(73) Assignee: iRobot Corporation, Bedford, MA (US)

( * ) Notice: Subject to any disclaimer, the term of this patent is extended or adjusted under 35 U.S.C. 154(b) by 233 days.

(21) Appl. No.: 16/121,048

(22) Filed: Sep. 4, 2018

(65) Prior Publication Data
US 2020/0070355 A1 Mar. 5, 2020

(51) Int. Cl.
| G06F 3/044 | (2006.01) |
| B25J 13/08 | (2006.01) |
| B25J 11/00 | (2006.01) |
| B25J 9/00 | (2006.01) |

(52) U.S. Cl.
CPC ........... *B25J 13/084* (2013.01); *B25J 9/0003* (2013.01); *B25J 11/0085* (2013.01)

(58) Field of Classification Search
CPC .... B25J 13/084; B25J 11/0085; B25J 9/0003; H04M 2250/22; G06F 3/0416; G06F 3/04886; G06F 3/044; A47L 2201/00; A47L 9/2857

USPC .............. 700/258; 345/173, 174; 73/514.32; 702/176; 438/239

See application file for complete search history.

(56) References Cited

U.S. PATENT DOCUMENTS

| 10,664,097 B1 * | 5/2020 | Smith .................. G06F 3/0412 |
| 2009/0125147 A1 | 5/2009 | Wang et al. |
| 2010/0085327 A1 | 4/2010 | Sleeman |
| 2014/0285440 A1 | 9/2014 | Stewart et al. |
| 2016/0259905 A1 * | 9/2016 | Park ..................... A61B 5/0402 |

(Continued)

OTHER PUBLICATIONS 2, 5 and 8-Channel Proximity/Touch Controller Data Sheet, Microchip Technology Inc. (37 pages) (Jul. 14, 2015).

(Continued)

*Primary Examiner* — Dalena Tran
(74) *Attorney, Agent, or Firm* — Schwegman Lundberg & Woessner, P.A.

(57) ABSTRACT

A mobile robot includes a recessed well in a top surface of the mobile robot, at least one capacitive sensor underlying the recessed well and having a first region and a second region, one or more mobility sensors, and a controller coupled to the at least one capacitive sensor and the one or more mobility sensors. The controller is configured to determine an operating status of the mobile robot responsive to output signals from the one or more mobility sensors, and selectively disregard an input at a first portion of the recessed well corresponding to the first region of the at least one capacitive sensor based on the operating status of the mobile robot.

20 Claims, 13 Drawing Sheets

(56) References Cited

U.S. PATENT DOCUMENTS

2016/0357298 A1* 12/2016 Kim .................... G06F 1/1643
2017/0332866 A1 11/2017 Nam et al.
2018/0003392 A1* 1/2018 Babu .................... H05B 1/0266

OTHER PUBLICATIONS

MTouch™Sensing Solution Acquisition Methods Capacitive Voltage Divider Data Sheet, Microchip Technology Inc. (28 pages) (Oct. 26, 2012).
Techniques for Robust Touch Sensing Design Data Sheet, Microchip Technology Inc. (30 pages) (Nov. 29, 2012).
"International Application Serial No. PCT US2019 048403, International Search Report dated Nov. 14, 2019", 2 pgs.
"International Application Serial No. PCT US2019 048403, Written Opinion dated Nov. 14, 2019", 7 pgs.

* cited by examiner

MOBILE ROBOTS WITH INTELLIGENT CAPACITIVE TOUCH SENSING

FIELD

The present disclosure relates to mobile robots, and more particularly, to user interfaces for mobile robots and mobile robots including the same.

BACKGROUND

Mobile robots, such as mobile cleaning robots, may include a user interface on one or more surfaces thereof. The user interface may allow local user interaction or control of the mobile robot by direct input of operating instructions or commands via the user interface. Some user interfaces may include input elements in the form of physical and/or virtual buttons, with frequently used operating instructions or commands displayed thereon. For example, a user interface for a mobile cleaning robot may include "CLEAN" and "HOME" buttons that, when actuated, instruct the robot to perform a cleaning mission and return to its base or charging station, respectively. Such buttons may utilize mechanical and/or electrical detection to identify button actuation.

Electrical detection of user inputs at a user interface may include resistive and/or capacitive touch sensing. A typical capacitive sensor (also referred to herein as a capacitive touch pad, or touchpad) includes a conductor separated from the user by a thin insulator. The conductor is connected to a sensing device with a conductive trace. The touchpad can define a capacitor relative to other conductors in its vicinity. For example, the conductor of the touchpad may define a capacitor relative to the electrical ground plane of the sensing device, which may be used as a reference to measure the capacitance at the touch pad.

The capacitance of the touch pad/ground plane pair can change as the local environment (i.e., the volume of adjacent space through which the electric field lines 1003 flow between the touch pad 1001/ground plane pair 1002 changes, as shown in FIG. 10. Areas 1011 with denser electric field concentration (also referred to as field density) may be more sensitive to changes in the local environment, while areas 1013 with lower field density may be less sensitive.

The capacitance measured by the sensing device can be shifted by introducing a dielectric near the touchpad and/or by effectively adding external capacitance between the touch pad and the ground reference. For example, as a user's finger is inserted into the space through which electric field lines flow between the touchpad and the ground plane of the sensing device (e.g., above the touchpad), the capacitance (Cf) may increase due to the dielectric effect. In addition to such dielectric properties, a user may also be conductive and can act as an additional external capacitor. The effective capacitance of a user may be the inverse sum of all series capacitors in the path from the touchpad to the user to the robot, and may thus be smaller than the respective capacitances of the constituent capacitors, due to the serial connection.

SUMMARY

Mobile robots and user interfaces (such as buttons on a top surface of the robot) can be operated to distinguish intended inputs by a user from unintended inputs. For example, unintended inputs may be detected in response to passing under furniture or other elements in the operating area of the robot, which may unintentionally activate one or more of the buttons on the top of the robot. In particular, some robots and user interfaces according to this invention may utilize different thresholds for detecting inputs at one or more buttons of a user interface under different robot operating conditions (or "operating status"), in order to reduce sensitivity to unintended inputs. For example, the robot or user interface may require a more exact or longer button press to detect an input when the robot is traveling in the operating area (for instance, during a cleaning mission) than when the robot is stationary or otherwise not in use.

According to some embodiments, a mobile robot includes a recessed well in a top surface of the mobile robot, at least one capacitive sensor underlying the recessed well, one or more mobility sensors, and a controller coupled to the at least one capacitive sensor and the one or more mobility sensors. The at least one capacitive sensor includes a first region and a second region. The controller is configured to determine an operating status of the mobile robot responsive to output signals from the one or more mobility sensors; and selectively disregard an input at a first portion of the recessed well corresponding to the first region of the at least one capacitive sensor based on the operating status of the mobile robot.

In some embodiments, the controller may be further configured to register an input received at a second portion of the recessed well corresponding to the second region of the at least one capacitive sensor independent of the operating status of the mobile robot. For example, in some embodiments, the first portion of the recessed well may be a peripheral region that defines a perimeter around the second portion of the recessed well.

In some embodiments, the mobile robot may further include peripheral recessed wells in the top surface of the robot adjacent the recessed well, and peripheral capacitive sensors underlying the peripheral recessed wells, respectively, and coupled to the controller. The controller may be further configured to selectively disregard respective inputs at the peripheral recessed wells based on the operating status of the mobile robot.

In some embodiments, the at least one capacitive sensor is configured to generate a detection signal indicative of the input. The controller may be configured to selectively disregard the input responsive to detecting the input at the first region based on the detection signal from the at least one input element, and identifying the input as unintended based on a characteristic of the detection signal. For example, in some embodiments, the characteristic of the detection signal may include a time duration of the input, a capacitance, and/or a temporal change in an electric field indicated by the detection signal.

In some embodiments, the at least one capacitive sensor may be first and second conductive spring-type capacitors defining the first and second regions, respectively. In some embodiments, the first and second conductive spring-type capacitors may have a concentric arrangement and may be separated by an isolation ring therebetween.

In some embodiments, an active guard including a conductive element may extend around the first region and/or the second region of the at least one capacitive sensor.

According to some embodiments, a method of operating a mobile robot includes executing, by at least one processor, computer readable instructions stored in a non-transitory computer readable storage medium. Execution of the computer readable instructions may cause the at least one processor to perform operations including receiving an input at a first portion of a recessed well in a top surface of the mobile robot, the first portion of the recessed well corresponding to a first region of at least one capacitive sensor underlying the recessed well and comprising the first region and a second region, determining an operating status of the mobile robot responsive to output signals from one or more mobility sensors of the mobile robot, and selectively disregarding the input at the first portion of the recessed well corresponding to the first region of the at least one capacitive sensor based on the operating status of the mobile robot.

According to some embodiments, a mobile robot includes a user interface having at least one input element configured to receive an input at a respective region adjacent a surface of the mobile robot, one or more mobility sensors, and a controller coupled to the user interface and the one or more mobility sensors. The controller is configured to determine an operating status of the mobile robot responsive to output signals from the one or more mobility sensors, and selectively disregard the input at the respective region based on the operating status of the mobile robot. For example, the operating status may indicate that the robot is executing a mission or is otherwise navigating in an operating environment, or that the robot is upside-down or its wheels are otherwise unloaded, based on the output signals from the one or more mobility sensors.

In some embodiments, the user interface may include a recessed well in the surface of the mobile robot, and the at least one input element may be at least one capacitive sensor underlying the recessed well. The at least one capacitive sensor may include first and second regions, and the respective region at which the input was received may be a portion of the recessed well corresponding to the first region of the at least one capacitive sensor.

In some embodiments, the controller may be configured to selectively disregard the input based on a respective robot function associated with the at least one input element and/or the respective region at which the input was received.

In some embodiments, the respective region may be a peripheral region of the user interface. The controller may be further configured to register an input received at a central region of the user interface independent of the operating status of the mobile robot. For example, in some embodiments, the peripheral region may define a perimeter or annulus around the central region.

In some embodiments, the at least one input element is configured to generate a respective detection signal indicative of the input. The controller may be configured to selectively disregard the input responsive to detecting the input at the respective region based on the respective detection signal from the at least one input element, and identifying the input as unintended based on a characteristic of the respective detection signal.

In some embodiments, the characteristic of the respective detection signal may be a time duration of the input.

In some embodiments, the at least one input element may include capacitive sensors, and the characteristic of the respective detection signal may be a capacitance and/or a temporal change in an electric field indicated thereby.

In some embodiments, an active guard may extend around a respective one of the capacitive sensors. The active guard may be a conductive element that can be selectively driven by the controller, for example with a signal opposite in polarity to that applied to the capacitive sensors, according to the operating status of the mobile robot.

In some embodiments, the capacitive sensors may be conductive spring-type capacitors. In some embodiments, the conductive spring-type capacitors may have a concentric arrangement and may be separated by an isolation ring therebetween.

In some embodiments, the controller may be configured to selectively disregard the input by altering a threshold for the detecting of the input based on the respective detection signal according to the operating status. For example, the controller may be configured to increase or decrease a capacitance threshold for detection of the input according to the operating status of the mobile robot.

In some embodiments, the controller may be configured to selectively disregard the input by altering operation of the at least one input element to detect the inputs according to the operating status. For example, the controller may be configured to deactivate input elements at one or more regions of the user interface when the mobile robot is moving or turned upside-down, and/or may be configured to deactivate one or more central input elements responsive to detection of the input at one or more peripheral input elements.

In some embodiments, the at least one input element is in a well having a bottom surface that is recessed relative to the surface of the mobile robot. The controller may be further configured to selectively disregard the input based on a precision of the input relative to the bottom surface. For example, in some embodiments, the bottom surface of the at least one input element may have a concave shape, and the selectively disregarding may be further based on the precision of the input relative to a center of the concave shape.

In some embodiments, the bottom surface of the at least one input element may be recessed relative to the surface of the mobile robot by a distance of between about 0.2 millimeter (mm) to about 2 mm.

In some embodiments, the operating status of the mobile robot indicates navigation of an operating environment or absence of a load at wheels of the mobile robot.

In some embodiments, a wireless communication interface may be coupled to the controller, and wherein the selectively disregarding is responsive to receiving a communication signal via the wireless communication interface.

In some embodiments, the at least one input element may be at least one capacitive sensor underlying a recessed well in the surface of the mobile robot. The at least one capacitive sensor may include first and second regions, and the controller may be configured to selectively disregard an input at a portion of the recessed well corresponding to the first region of the at least one capacitive sensor based on the operating status of the mobile robot.

According to some embodiments, a method of operating a mobile robot includes executing, by at least one processor, computer readable instructions stored in a non-transitory computer readable storage medium. Execution of the computer readable instructions may cause the at least one processor to perform operations including receiving an input at a respective region adjacent a surface of the mobile robot via at least one input element of a user interface of the mobile robot, determining an operating status of the mobile robot responsive to output signals from one or more mobility sensors of the mobile robot, and selectively disregarding the input received at the respective region based on the operating status of the mobile robot.

Further features, advantages and details of the present disclosure, including any and all combinations of the above embodiments, will be appreciated by those of ordinary skill in the art from a reading of the figures and the detailed description of the embodiments that follow, such description being merely illustrative of the present disclosure.

DETAILED DESCRIPTION OF EMBODIMENTS

Figure 1:
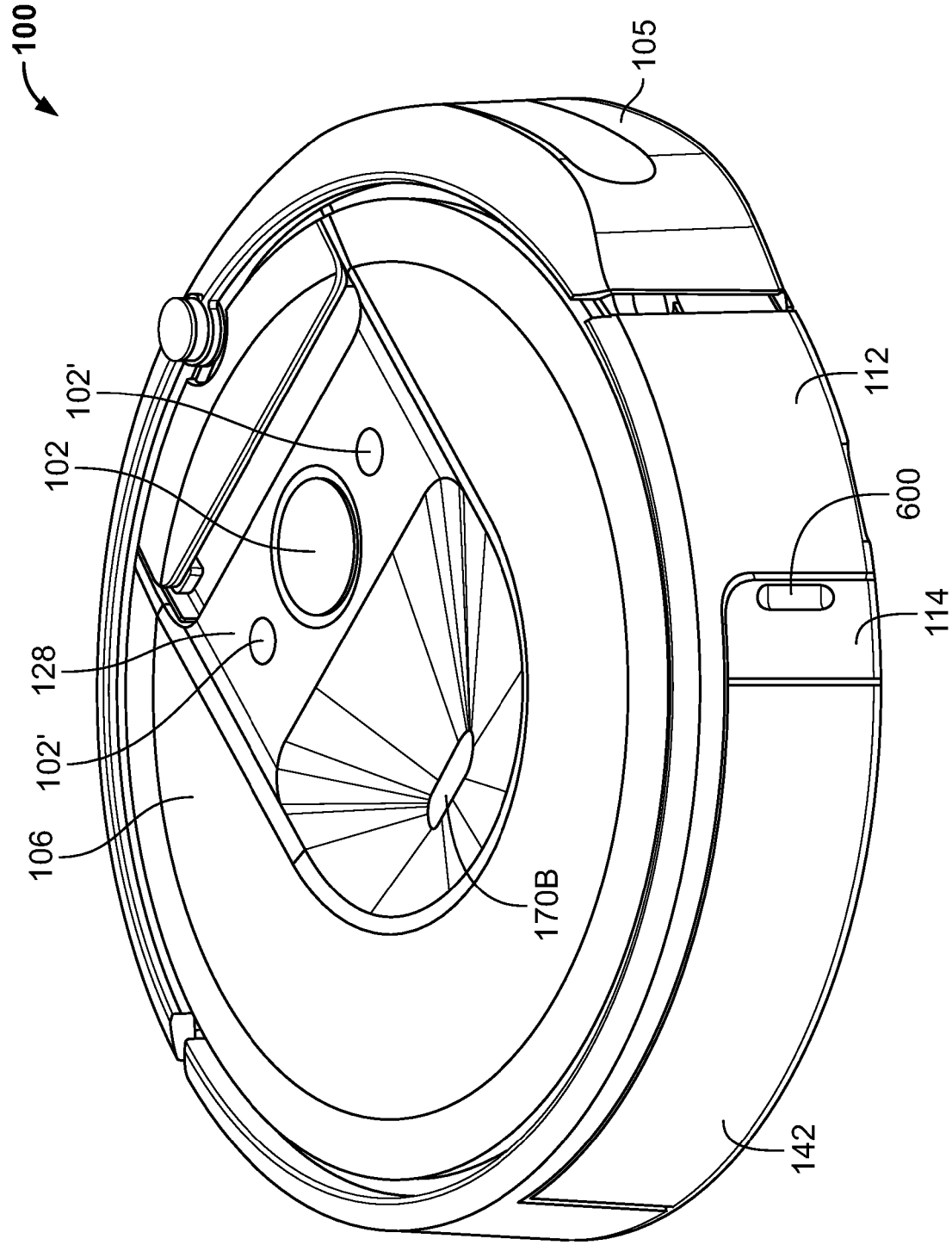
FIG. 1 is a top perspective view of a mobile robot according to some embodiments described herein.

Some embodiments described herein may arise from recognition that mobile robots including a user interface on an external surface thereof may be susceptible to detection of unintended inputs while navigating an operating environment. For example, for a mobile robot including a user interface with capacitive sensors as input elements, large conductors (e.g., metal furniture, metal plates or supports on furniture, etc.) in an operating environment of the mobile robot can appear as additional external capacitance by coupling to the capacitive sensing device's ground reference. Wet surfaces or surfaces that are otherwise charged (e.g., due to static electricity) may also appear as added capacitance. This added capacitance may be detected at a touch pad of the capacitive sensor, and if sufficiently high, may trigger detection of an unintended (also referred to herein as "spurious") input by the capacitive sensor, which can be problematic for operation of the mobile robot. For example, an unintended input detected at in input element that is associated with pausing or stopping robot operation may strand the mobile robot during execution of a mission or other navigation in the operating environment.

Accordingly, embodiments described herein are directed to mobile robots that are operable to selectively disregard inputs or otherwise alter detection operations of one or more user input elements of a user interface based on an operating mode or other operating status of the mobile robot, thereby reducing sensitivity to unintended inputs. Although described primarily herein with reference to disregarding detection of and/or otherwise reducing sensitivity to unintended inputs received at a robot user interface including capacitive sensor-based user input elements, it will be understood that embodiments of the inventive concepts are not limited thereto, and can be similarly applied to user interfaces that include physical or mechanical input actuation as well. For example, operations described herein for reducing sensitivity to environmental conditions that may be detected as inputs can be used to selectively disable portions of a robot user interface including mechanically actuated buttons based on the operating mode or other status of the robot, in a manner similar to the operations described herein with reference to electrical or capacitive inputs.

As used herein, "localization" may include determining the location of an object in an environment and/or the orientation of that object. A combination of location and orientation is referred to as a "pose." "Navigation" includes, without limitation, determining a route, such as a route from a source location to a destination location, and moving in an environment ("traversing") in accordance with that route. Locations in an environment or portions of an environment may be "covered" or "traversed" or "explored" or "navigated" as a mobile robot moves in the locations. Both navigation and localization may utilize sensors generally referred to herein as "mobility" sensors, which may include (but are not limited to) gyroscopic/inertial sensors, dead-reckoning/odometry sensors, and/or camera/imaging sensors.

Figure 2:
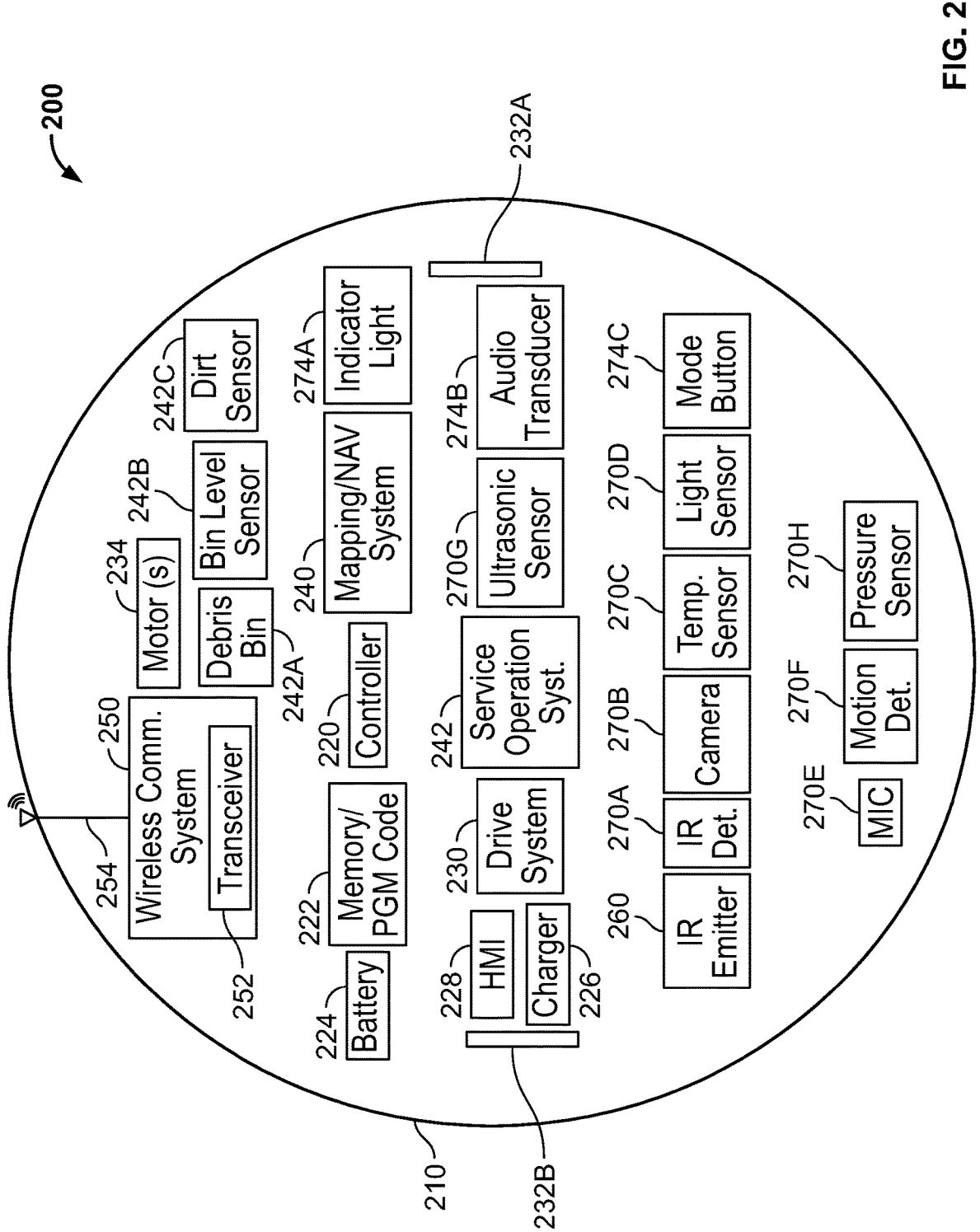
FIG. 2 is a schematic diagram representing a mobile robot according to some embodiments described herein.

FIG. 1 is a top perspective view of a mobile robot according to some embodiments described herein, and FIG. 2 is a schematic diagram representing a mobile robot according to some embodiments described herein. While illustrated with reference to vacuum cleaning robots, the mobile robots 100, 200 of FIGS. 1 and 2 are representative and may be any suitable robot and associated computing device(s) that are configured to perform operations for selective disregarding of inputs at user interfaces as described herein, and it will be appreciated that not all of the described components, features and functionality are required in mobile robots according to embodiments described herein.

With reference to the external view of FIG. 1, the mobile robot 100 includes a bumper 105 positioned at a periphery of the mobile robot housing 108, facing the direction of forward travel. The housing 108 is illustrated in FIG. 1 as having a rounded or circular shape; however, embodiments described herein are not limited to the shapes shown, and the housing 108 may have other shapes (e.g., a squared front section on which the bumper 105 is mounted) in other embodiments. An edge surface 112 opposite the bumper 105 includes a removable debris bin 142, which can be opened by actuation of a latch 114.

A user interface 128 is provided adjacent a top surface 106 of the housing 108. The user interface 128 includes multiple user input elements, illustrated as externally accessible buttons 102, 102'. In some embodiments, the buttons 102, 102' may be recessed relative to the top surface 106 of the housing 108. In the example vacuum cleaning robot 100 of FIG. 1, the central button 102 may represent a "CLEAN" button associated with an area cleaning function of the robot 100, and the peripheral buttons 102' may represent HOME" and "SPOT" buttons associated with a docking function and a spot cleaning function of the mobile robot, respectively. Operation of the buttons 102, 102' and/or operations performed in response to detection signals output therefrom may be altered based on the operating status of the mobile robot 100, as described in greater detail herein.

As shown in the schematic diagram of FIG. 2, an example mobile robot 200 includes a chassis 210, a controller 220, memory 222, a battery 224, a battery charger 226, a human-machine interface (HMI) 228, a drive system 230, a mapping/navigation system 240, a service operation system 242 (also referred to herein as "cleaning system" and "cleaning head"), a wireless communication system 250, an infrared (IR) emitter 260, environmental sensors 270A-H, a debris bin 242A (to store debris collected by a cleaning operation), a bin level sensor 242B, a dirt extraction sensor 242C (to detect the density of characteristics of the debris collected by the cleaning operation), an indicator light 274A, an audio transducer 274B, and a cleaning mode selection switch or button 274C.

The environmental sensors 270A-270H may include a camera 270B mounted on a top surface of the mobile robot 200, such as the recessed camera 170B shown in FIG. 1. The camera 270B can be used to navigate the robot 200 and acquire images for other operational use. In some embodiments, the camera 270B is a visual simultaneous location and mapping (VSLAM) camera and is used to detect features and landmarks in the operating environment and build an occupancy map based thereon.

The controller 220 may include any suitably configured processor or processors. The processor(s) may include one or more data processing circuits, such as a general purpose and/or special purpose processor (such as a microprocessor and/or digital signal processor) that may be collocated or distributed across one or more networks. The processor is configured to execute program code stored in the memory 222, described below as a computer readable storage medium, to perform some or all of the operations and methods that are described above for one or more of the embodiments. The memory 222 is representative of the one or more memory devices containing the software and data used for facilitating operations of the robot in accordance with some embodiments of the present disclosure. The memory 222 may include, but is not limited to, the following types of devices: cache, ROM, PROM, EPROM, EEPROM, flash, SRAM, and DRAM. The processor is thus in communication with the controller 200, memory 222, the cleaning system 242 and drive system 230.

The drive system 230 may include any suitable mechanism or system for actively and controllably transiting the robot 200 through an operating environment. According to some embodiments, the drive system 230 includes a roller, rollers, track or wheels 232A, 232B and one or more onboard (i.e., carried by the mobile robot 200) electric motors 234 (collectively referred to herein as a "drive" or "drive system") operable by the controller 220 to convey the robot 200 across a floor of the operating environment.

The service operation system 242 may be optional in some embodiments, and is operable to execute a service operation in the operating environment. According to some embodiments, the service operation system 242 includes a floor cleaning system that cleans a floor surface of the operating environment as the robot 200 transits through the space. In some embodiments, the service operation system 242 includes a suction head and an onboard vacuum generator to vacuum clean the floor. In some embodiments, the service operation system 242 includes an end effector such as (but not limited to) a sweeping or mopping mechanism, one or more rotating brushes, rollers, wet or dry stationary or oscillating and/or vibrating cloths, or multilayer pad assemblies.

The wireless communication system 250 includes a wireless communication transceiver or module 252 and an associated antenna 254 to enable wireless communication between the robot 200 and the various other connected devices in the operating environment, as well as network segments serviced by WAPs, gateways and hubs which may define a private network, of which the mobile robot 200 may define a node. For example, the wireless communication transceiver or module 252 may be a Wi-Fi module.

In some embodiments, the mobile robot 200 may be generally configured in the manner of or include features from the Roomba® floor cleaning robot and/or robots as described in U.S. Pat. Nos. 9,993,129 and 7,024,278, and in U.S. Published Application Nos. 2017/0203446 and 2007/0250212, the disclosures of which are incorporated herein by reference, with suitable modifications. In other embodiments, the mobile robot 200 may be generally configured as an autonomous patrolling robot that includes a telescoping mast having one or more elements associated with the sensor elements 270A-H and/or the wireless communication circuit or system 250 mounted thereon or otherwise operably associated therewith.

With reference again to FIGS. 1-2, the mobile robots 100, 200 may include a localizing circuit that builds a metric, range-based map of walls and obstacles (using, for example, a laser range finder, sonar, radar, triangulation, time-of-flight, or phase difference calculating) and/or an occupancy map of free space (for example, traversable floor space, or floor space not occupied by an object or fixture), and can localize the robot on the map(s) using techniques such as scan matching, ICP (iterative closest point), and/or RANSAC (RANdom Sample consensus). Additionally or alternatively, the mobile robots 100, 200 may include a localizing circuit that builds a fingerprinted, feature-based constellation or topological map of features, landmarks, fiducials and/or beacons (using, for example, a camera or point cloud generating 3D scanner, together with a feature transform to identify, store, and recognize natural or artificial keypoints, features, and/or landmarks) within an occupancy map of free space, and can localize the robot on this occupancy map (and in some embodiments, in particular segments or demarcated regions thereof) using techniques such as VSLAM (vision-based/visual simultaneous localization and mapping). In either case, a unique identity linked to unique rooms or areas may be associated by an end user with a household room-type or unique room label ("Living Room") via the user interface of any of the network entities. The occupancy map (also referred to herein as a "floorplan" for the operating environment) may include data defining multiple surface locations of the environment (for example, by pixels), each having a value that corresponds to whether the pixel location corresponds to a surface location that is occupied, traversable by the mobile robot 200, or unexplored.

The localizing circuit may be defined by inputs from one or more of the sensors 270A-270H of the mobile robot 200, which may be used by the controller 220 to perform localization and/or navigation in the operating environment. More particularly, one or more of the sensors 270A-270H are configured to detect sensor readings from objects located in the operating environment, and the controller 220 is configured to determine a current pose (a "pose" includes an absolute or relative location and optionally an absolute or relative orientation) of the mobile robot 200 with reference to the observed objects ("objects" not only including physical objects including observable features, as well as surface "objects" formed of optically or otherwise detectable surface characteristics such as corners, lines, patterns) based on the localization data detected by the sensors 270A-270H. Poses for objects may be determined as well. The mobile robot 200 may be further configured to associate a robot pose (or location) with a room identifier specifically associated with the observed objects or their poses stationed in the room or observable upon the room's components (walls, ceiling, lighting, doorway, furniture), as indicated by the occupancy map. The sensors 270A-270H may further gyroscopic/inertial sensors, dead-reckoning/odometry sensors, and/or camera/imaging sensors, and may be collectively referred to herein as mobility sensors that provide output signals from which the controller 220 can determine the operating status of the mobile robot 200 as described in greater detail herein.

Figure 3A:
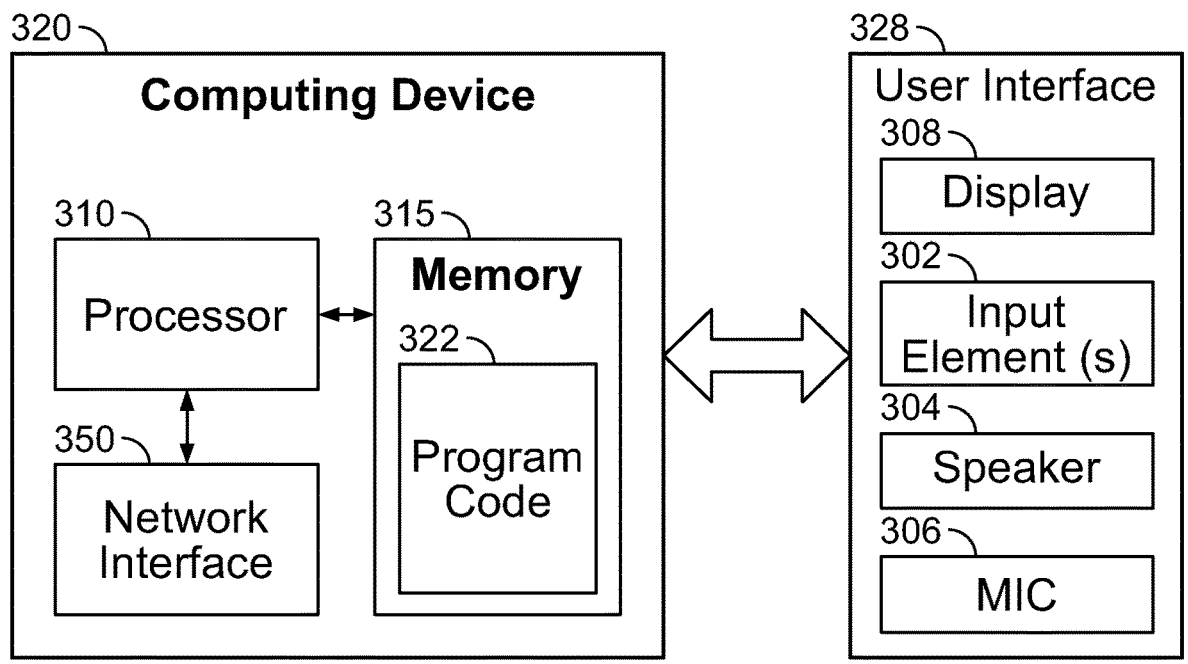
FIG. 3A is a schematic diagram representing a computing device and a user interface associated with a mobile robot according to some embodiments described herein.

FIG. 3A is a block diagram illustrating a computing device 320 and a user interface 328 associated with a mobile robot according to some embodiments described herein. The computing device 320 may be a mobile robot control unit, such as the controller 220 of the mobile robot 200 of FIG. 2. As shown in FIG. 3, the computing device 320 include a processor 310, a memory 315 including program code 322 stored therein, and a network interface 350. The processor 310 may include any suitably configured processor or processors configured to execute program code 322 stored in the memory 315, described herein as a computer readable storage medium, to perform some or all of the operations and methods that are described above for one or more of the embodiments. The memory 315 is representative of the one or more memory devices containing the software and data used for facilitating operations of the robot in accordance with some embodiments of the present disclosure.

The computing device 320 is communicatively coupled to the user interface 328. In some embodiments, the user interface 328 may be a human-machine interface (HMI) that is accessible from an external surface of a mobile robot, such as the user interface 128 of FIG. 1 or the HMI 228 of the mobile robot 200 of FIG. 2. The user interface may include, but is not limited to, a display 308, at least one input element 302, a speaker 304, and/or a microphone 306. For example, the input element(s) 302 may include one or more physical or virtual buttons associated with respective functions of the mobile robot, such as navigation functions, recharging functions, etc. The input element(s) 302 may include mechanical and/or electrical components that are configured to receive inputs from a user of the mobile robot, and generate respective detection signals indicative of the inputs in response. For example, the input element(s) 302 may include any combination of mechanically and/or electrically actuated sensor elements, including but not limited to mechanical and/or electrical switches, resistive touch sensors, and/or capacitive touch sensors. The computing device 320 may also be coupled to one or more mobility sensors of the mobile robot, such as the sensors 270A-270H of the mobile robot 200 of FIG. 2.

Figure 3B:
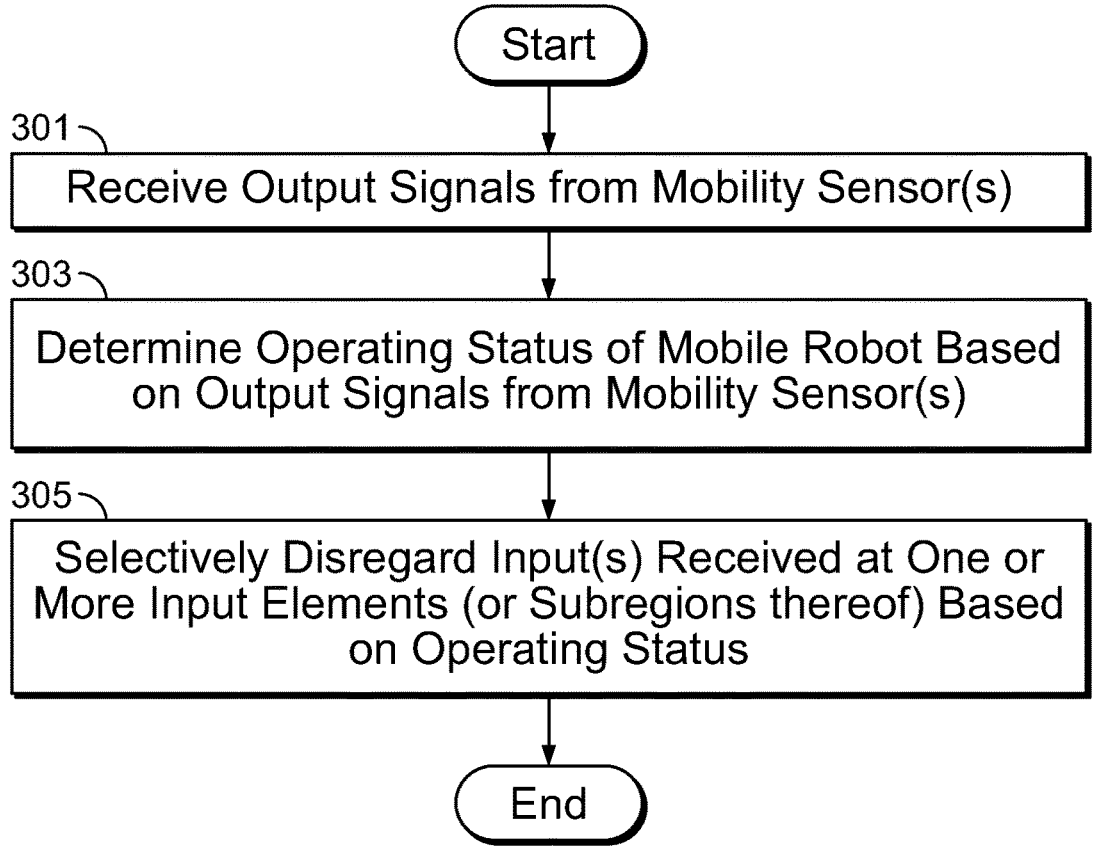
FIG. 3B is a flowchart illustrating operations for selectively disregarding inputs at user interface associated with a mobile robot according to some embodiments described herein.

FIG. 3B is a flowchart illustrating operations for selectively disregarding inputs by a computing device and a user interface associated with a mobile robot according to some embodiments described herein. The operations of FIG. 3B are described below with reference to the computing device 320 and user interface 328 of FIG. 3A for convenience, but are not limited to performance by the elements shown. Referring now to FIGS. 3A and 3B, the computing device 320 is configured to receive output signals from one or more mobility sensors (at block 301) and determine an operating status of the mobile robot based on the output signals from the mobility sensor(s) (at block 303). For example, based on the output signals from the motion detector 270F, the drive system 230, and/or the camera 270B, the computing device 320 may determine that the robot 200 is executing a mission or otherwise navigating the operating environment (e.g., based on gyroscopic, odometry, and/or imaging signals received from the respective sensors 270F, 230, and/or 270B). As another example, based on the output signals from one or more of the mobility sensors, the computing device 320 may determine that the robot 200 is upside down, kidnapped, or being serviced (e.g., based on output signals indicating inverted camera images and/or absence of a load or resistance at the wheels 232A, 232B of the mobile robot 200).

Based on the determined operating status of the mobile robot, the computing device 320 is configured to selectively disregard input(s) received at one or more of the input elements 302 or subregions thereof (at block 305). The inputs received at particular input elements 302 may be selectively disregarded based on, for example, respective robot functions associated with the input elements 302 and/or a respective region or area of the mobile robot at which the input(s) were received. For instance, based on determining that the robot 200 is executing a mission or is otherwise navigating the environment from the output signals of the mobility sensor(s), the computing device 320 may selectively disregard inputs received at (or otherwise "lockout" the functionality of) particular one(s) of the input elements 302 associated with functions that are not germane to the mission or navigation. Additionally or alternatively, the computing device 320 may selectively disregard inputs at received at input elements 302 positioned at peripheral areas of the user interface 328 (or peripheral areas of a particular input element 302) based on the determined operating status, while registering inputs received at input elements 302 positioned at a central area of the user interface 328 (or received at a central area of a particular input element 302) regardless of the determined operating status, for example, to require increased input precision during the mission or navigation.

Operations performed by the computing device 320 in order to selectively disregard inputs (at block 305) may be implemented, for example, by altering respective thresholds for detecting inputs and/or altering operation of one or more of the input elements 302 according to the determined operating status of the mobile robot. For instance, the computing device 320 may be configured to alter or vary the capacitance threshold for detecting an input based on the detection signals from capacitive sensor-type input elements 302 according to a particular operating status of the mobile robot, e.g., a higher capacitance threshold may be required to detect an input when the mobile robot is in motion than when the mobile robot is stationary. Additionally or alternatively, the computing device 320 may be configured to distinguish intended inputs from unintended inputs based on characteristics of the respective detection signals from the input elements 302. For example, based on temporal information indicated by the detection signals from capacitive sensor-type input elements 302, the computing device 302 may identify signals that are too short (e.g., less than 100 milliseconds (ms) or less than 50 ms) or too long (e.g., greater than a few seconds) in duration as unintended inputs. Likewise, the computing device 302 may identify and distinguish electric field changes corresponding to a human finger from electric field changes corresponding to other objects, as indicated by the detection signals output from the capacitive sensor-type input elements 302.

The computing device 320 can thereby selectively disregard inputs received at the input elements 302 or subregions of particular input elements 302 according to the current operating status of the mobile robot, which may reduce the detection of unintended inputs, for example, during navigation or other operation of the mobile robot in the operating environment. That is, the computing device 320 is configured to identify and disregard some inputs as unintended or "spurious" based on the configuration of (and/or detection signals output from) the input elements 302 of the user interface 328, in combination with the determined operating status of the mobile robot. Particular examples of mobile robot user interfaces and associated operations to reduce detection of unintended inputs are described below with reference to the embodiments of FIGS. 4-8.

FIGS. 4A, 4B, 4C, and 4D are plan, cross-sectional, external perspective, and internal perspective views, respectively, illustrating a user interface of a mobile robot according to some embodiments described herein. As shown in FIGS. 4A-4D, a mobile robot (such as the mobile robot 100, 200) includes a user interface 428 adjacent an external surface 406 of the mobile robot. The user interface 428 includes a plurality of input elements 402, 402'. The input elements 402, 402' include bottom surfaces 402b that are recessed (also referred to herein as recessed wells) relative to the surface 406 of the robot, and one or more capacitive-type sensor elements 402c, 402p (also referred to herein as capacitive sensors) underlying the recessed wells 402b. The recessed wells 402b are otherwise open to the surface 406 of the robot. The surface 406 may be top surface of the robot, and may be part of a removable cover in some embodiments. The user interface 428 may be defined by a portion of the surface 406, and remaining portions of the surface 406 may extend to cover other sensors (such as the camera 170B of FIG. 1) and/or may extend towards edge surfaces and/or the bumper of the robot.

Figure 4A:
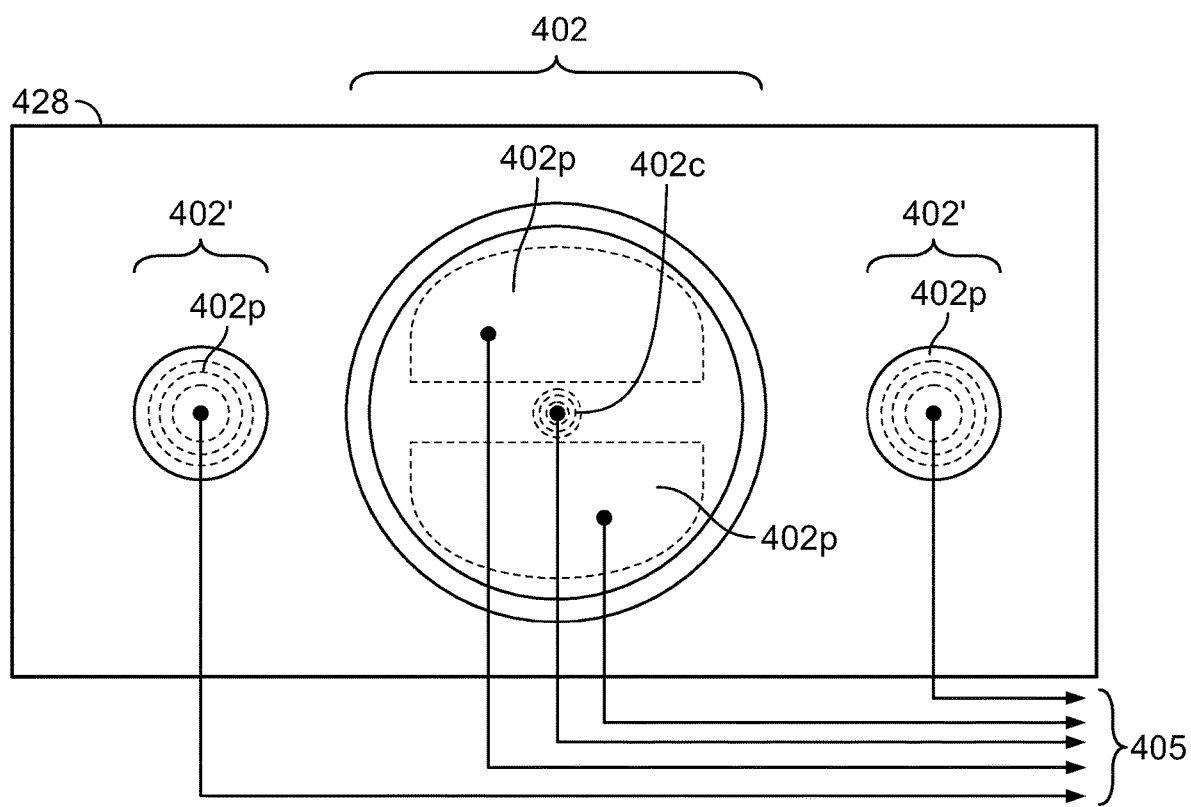
FIG. 4A is a plan view illustrating a user interface of a mobile robot according to some embodiments described herein.
Figure 4B:
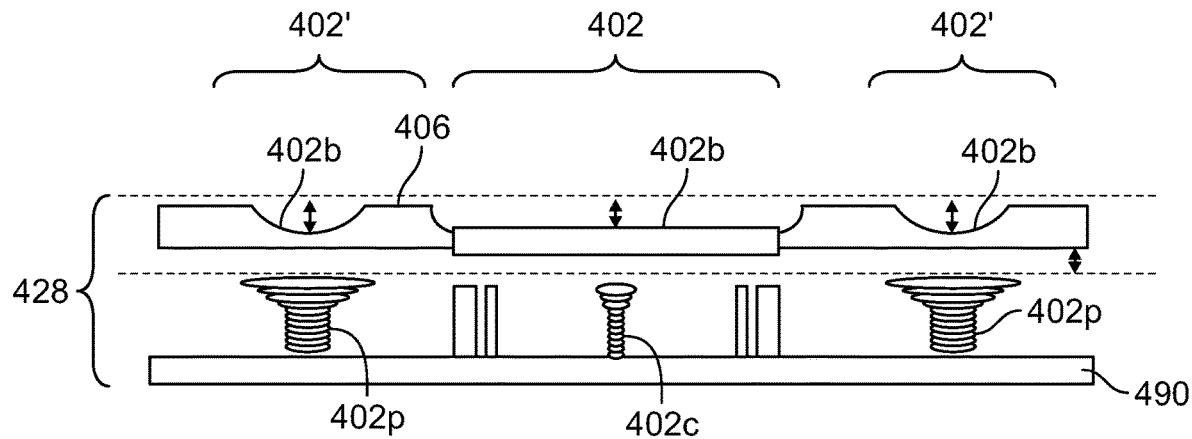
FIG. 4B is a cross-sectional view of the user interface of FIG. 4A.

As shown in the plan view of FIG. 4A and the cross-section of FIG. 4B, the top surface 406 of the mobile robot includes multiple recessed wells 402b therein, and one or more capacitive sensors 402c, 402p are provided below each of the recessed wells 402b. In particular, the example embodiments of FIGS. 4A-4D include three recessed wells 402b, where the two recessed wells 402b positioned at peripheral regions of the user interface 428 (also referred to herein as peripheral well regions) include respective peripheral capacitive sensors 402p to define peripheral input elements 402', and the recessed well 402b positioned at a central region of the user interface 428 (also referred to herein as a central well region) includes two peripheral capacitive sensors 402p and a central capacitive sensor 402c therebetween to define a central input element 402. In the examples of FIGS. 4A and 4B, the central input element 402 includes a flat or planar bottom surface 402b, while peripheral input elements 402' each include a dished or concave bottom surface 402b. However, it will be understood that the shapes (and/or combination of shapes) of these surfaces 402b are not limited to those shown, and that the bottom surfaces 402b may have dished and/or flat shapes in various combinations regardless of location of the input elements 402, 402' on the user interface 428 and/or the surface 406.

As shown in the plan view of FIG. 4A, the peripheral input elements 402' each include a respective conductive coil spring-type capacitive sensor 402p, while the central input element 402 includes capacitive sensors 402c, 402p configured to receive inputs at multiple subregions of the input element 402. In particular, the central input element 402 includes sheet metal spring-type capacitive sensors 402p arranged at edges of the central well region 402b, and a conductive coil spring-type capacitive sensor 402c arranged between the sheet metal spring-type capacitive sensors 402p. For example, the central input element 402 may define a single physical button, with the underlying capacitive sensors 402c, 402p defining multiple subregions within the single button.

Figure 4C:
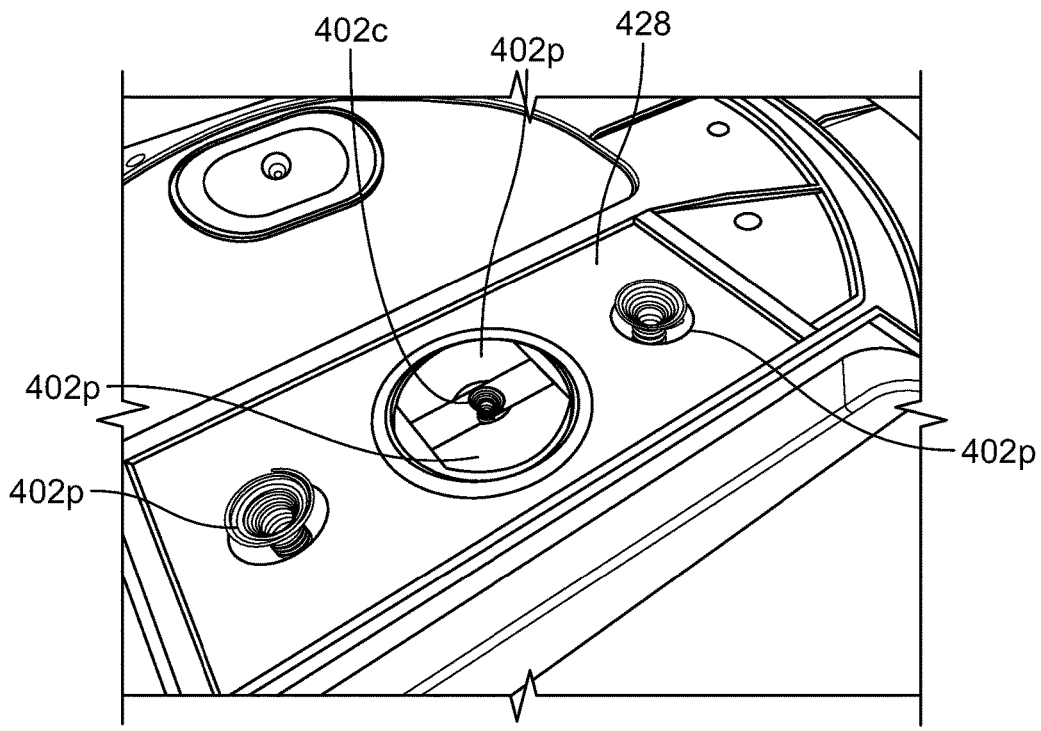
FIG. 4C is an external perspective view illustrating the user interface of FIG. 4A with the top cover of the mobile robot removed.
Figure 4D:
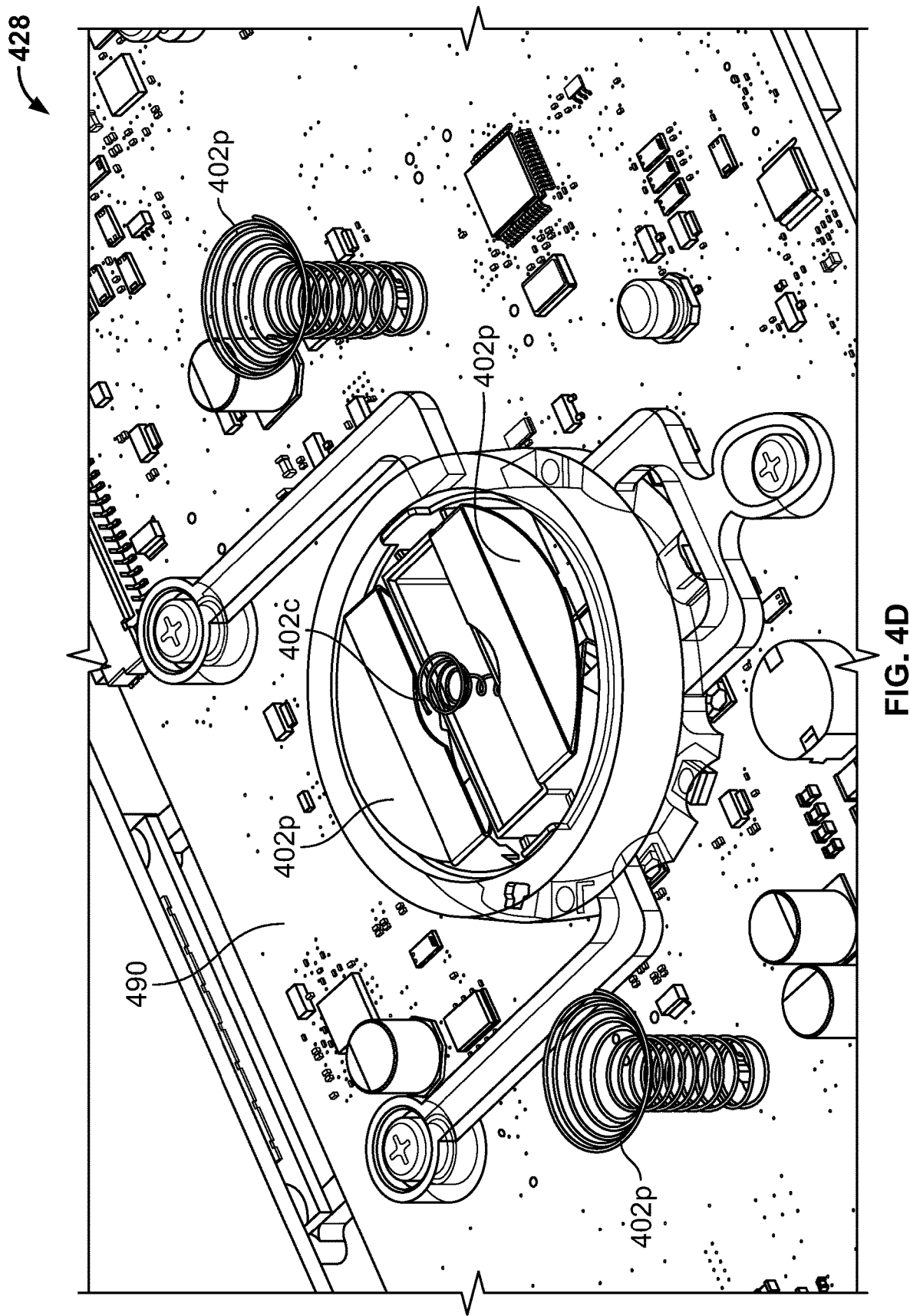
FIG. 4D is an internal perspective view illustrating the arrangement and coupling of input elements of the user interface of FIG. 4A.

The external perspective view of FIG. 4C illustrates the underlying capacitive sensors 402c, 402p of the user interface 428 in greater detail with the top cover (including portions of the top surface 406) of the mobile robot removed. The internal perspective view of FIG. 4D illustrates the arrangement and coupling of the conductive spring-type capacitive sensors 402c, 402p and other internal electrical components to a printed circuit board 490. The capacitive sensors 402p, 402c are configured to generate respective detection signals 405 indicative of inputs received at the peripheral regions and the central region (including the multiple subregions of the central input element 402), based on the layout and arrangement of the associated input elements 402, 402' and recessed wells 402b. The detection signals 405 are output via the printed circuit board 490 to an electronic control unit, such as the controller 220 of FIG. 2 or the computing device 320 of FIG. 3, which may selectively disregard inputs received at one or more of the regions based on the operating status of the mobile robot as described herein.

In the example embodiments of FIGS. 4A-4D, the control unit is configured to selectively disregard inputs at one or more of the peripheral capacitive sensors 402p, including inputs at edge portions (corresponding to the locations of the underlying peripheral capacitive sensors 402p) of the central input element 402, based on the operating status. The control unit may also be configured to register an input at or near the center (corresponding to the location of the underlying central capacitive sensor 402c) of the central input element 402 independent or regardless of the operating status of the mobile robot. As noted above, the control unit may determine the operating status of the mobile robot responsive to output signals from one or more mobility sensors of the robot, such as signals from a gyroscope, camera, and/or dead reckoning measurements.

For example, where the mobile robot is a cleaning robot, the central input element 402 may be a "CLEAN" button associated with an area cleaning function of the robot, and the peripheral input elements 402' may be "HOME" and "SPOT" buttons associated with a docking function and a spot cleaning function of the mobile robot, respectively. When the robot is stationary, the control unit may register inputs received at both the perimeter and center regions (overlying the peripheral capacitive sensors 402p and the central capacitive sensor 402c) of the "CLEAN" button 402.

However, when the robot is executing an area cleaning mission, the control unit may disregard inputs received at a perimeter of the "CLEAN" button 402 (overlying the peripheral capacitive sensor 402p), but may still register inputs received at or near the center of the "CLEAN" button 402 (overlying the central capacitive sensor 402c), effectively increasing the threshold for detection of inputs and requiring more precise inputs from a user according to the operating status of the mobile robot. The control unit may likewise be configured to selectively disregard inputs received at one or more of the peripheral input elements 402' based on robot operating status; for example, the "HOME" and/or "SPOT" buttons 402' may be less relevant to (and thus selectively ignored during) the area cleaning mission.

The recessed well 402b of the central input element 402 may also be recessed by a different distance than one or more of the recessed wells 402b of the peripheral input elements 402' relative to the top surface 406 of the robot. For example, the bottom surface 402b of the central input element 402 (e.g., the "CLEAN" button) may be recessed by a distance or depth of between about 0.5 millimeter (mm) to about 2 mm or more, while the bottom surface 402b of the peripheral input elements 402' (e.g., the "HOME" and "SPOT" buttons) may be recessed by a greater or lesser distance or depth relative to the top surface 406. The additional input precision imposed by the differing depths of the recessed wells 402b may be used in combination with the operations for selectively disregarding inputs described herein to further increase the threshold for detecting inputs at different regions of the user interface 428 based on the operating status of the mobile robot.

In some embodiments, the control unit may be configured to detect inputs at respective regions of an input element based on respective detection signals from the corresponding underlying capacitive sensors, and may be configured to identify one or more of the inputs as unintended based on characteristics of the respective detection signals described herein. For example, the detection signals may be used to identify or distinguish inputs as corresponding to a user's finger (rather than to a large conductor the operating environment) based on respective time durations of the inputs and/or temporal changes in electric field density indicated by detection signals. For instance, inputs indicating a change in capacitance for a time duration of greater than about 100 milliseconds (ms) but less than about 20 seconds may be identified as intended, while shorter or longer inputs may be identified as unintended, based on typical human touch response times.

In some embodiments, the control unit may be configured to selectively disregard inputs by altering respective thresholds for detecting inputs according to the determined robot operating status. For example, the amount of capacitance required for detection of an intended input by the control unit may be increased when the robot is executing a mission or otherwise navigating an operating environment, as compared to when the robot is stationary.

In some embodiments, the control unit may be configured to alter the operation of one or more input elements described herein to detect inputs according to the operating status of the mobile robot. For example, the control unit may deactivate one or more sub regions of a user interface when the robot is in motion or turned over, as indicated by output signals from one or more of the mobility sensors (e.g., indicating movement of the robot or an absence of a load at the wheels of the robot). In the example of FIGS. 4A-4D, the control unit may be configured to deactivate the peripheral input elements 402p corresponding to the "SPOT" and "HOME" when the robot is moving or turned over. That is, subregions of the user interface and/or associated input elements corresponding to particular mobile robot functions may be selectively deactivated based on the relevance of such functions to the current robot operation.

In some embodiments, any of the operations for selectively disregarding inputs as described herein may be performed by the control unit responsive to receiving a signal or command via a wireless communication interface, such as the communication interface 250 of FIG. 2. For instance, the sensitivity and/or functionality of the user interface may be selected via an application executing on a remote device, such as a user's mobile phone, and may be transmitted to the mobile robot. The mobile robot may thereby selectively disregard inputs received at one or more subregions of the user interface and/or input elements associated therewith in accordance with the sensitivity and/or functionality selected at the remote device.

FIGS. 5A, 5B, 5C, and 5D are plan, internal perspective, internal cutaway, and cross-sectional views, respectively, illustrating a user interface of a mobile robot according to some embodiments described herein. As shown in FIGS. 5A-5D, a mobile robot (such as the mobile robot 100, 200) includes a user interface 528 adjacent an external surface 506 of the mobile robot. The user interface 528 includes a plurality of input elements 502. Similar to the embodiments of FIGS. 4A-4D, the input elements 502 may include bottom surfaces/recessed wells 502b that are recessed relative to the surface 506, and one or more capacitive sensors 502c, 502p below each recessed well 502b.

Figure 5A:
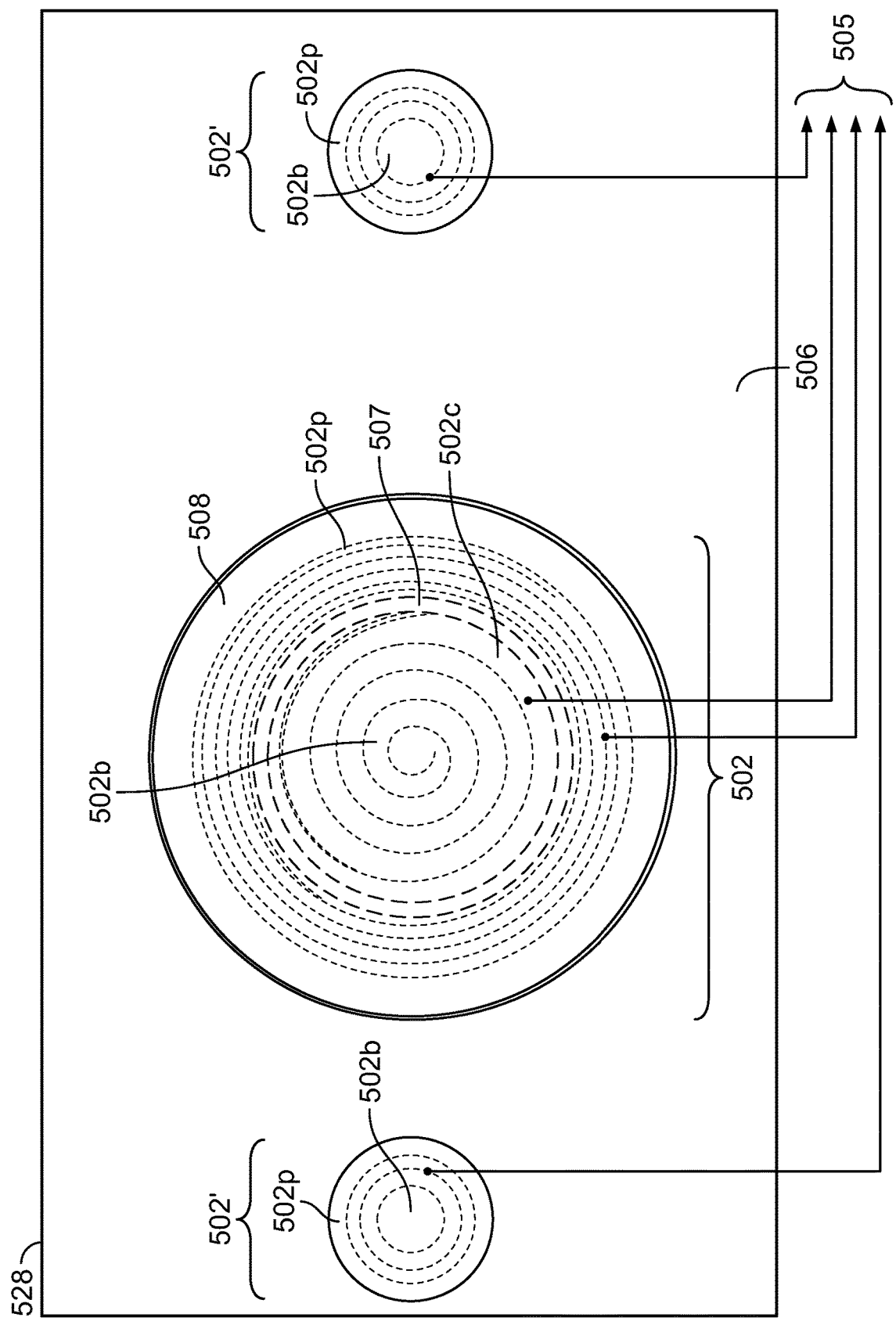
FIG. 5A is a plan view illustrating a user interface of a mobile robot according to some embodiments described herein.

As shown in the plan view of FIG. 5A, example embodiments include three recessed wells 502b, where the two peripheral well regions 502b positioned at peripheral regions of the user interface 528 each include a respective peripheral capacitive sensor 502p to define peripheral input elements 502', and the a central well region 502b positioned at a central region of the user interface 528 includes a peripheral capacitive sensor 502p and a central capacitive sensor 502c having a concentric arrangement to define a central input element 502. The recessed wells 502b defining the central and peripheral input elements 502 and 502' may include flat or planar bottom surfaces and/or dished or concave bottom surfaces in various combinations, regardless of the location of the input elements 502, 502' on the user interface 528 and/or the surface 506.

Still referring to FIG. 5A, the peripheral input elements 502' each include a respective conductive coil spring-type capacitive sensor 502p, while the central input element 502 includes concentrically-arranged conductive coil spring-type capacitive sensors 502c, 502p configured to receive inputs at multiple subregions of the input element 502. In particular, the central input element 502 includes a first sensing region overlying the outer coil spring-type capacitive sensor 502p, which defines a perimeter or annulus around a second sensing region overlying the inner coil spring-type capacitive sensor 502c. For example, the central input element 502 may define a single physical button, with the underlying capacitive sensors 502c, 502p defining two concentric subregions within the single button. The capacitive sensors 502c and/or 502p may have conical spring shapes in some embodiments. The contact area defined by the outer and inner capacitive sensors 502p and 502c may be similar or the same in some embodiments, or may differ in other embodiments.

Figure 5B:
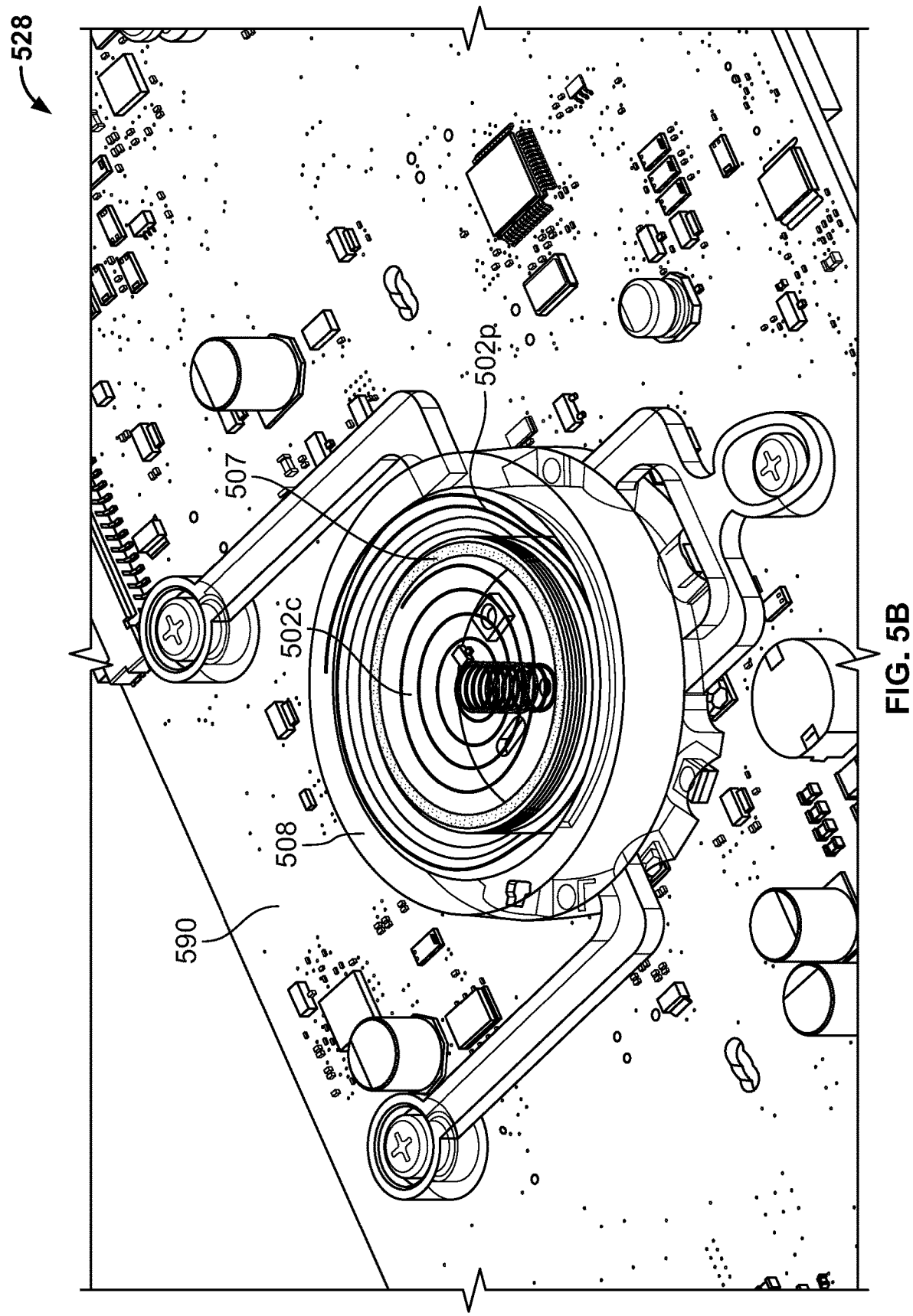
FIG. 5B is an internal perspective view illustrating the arrangement and coupling of input elements of the user interface of FIG. 5A.
Figure 5C:
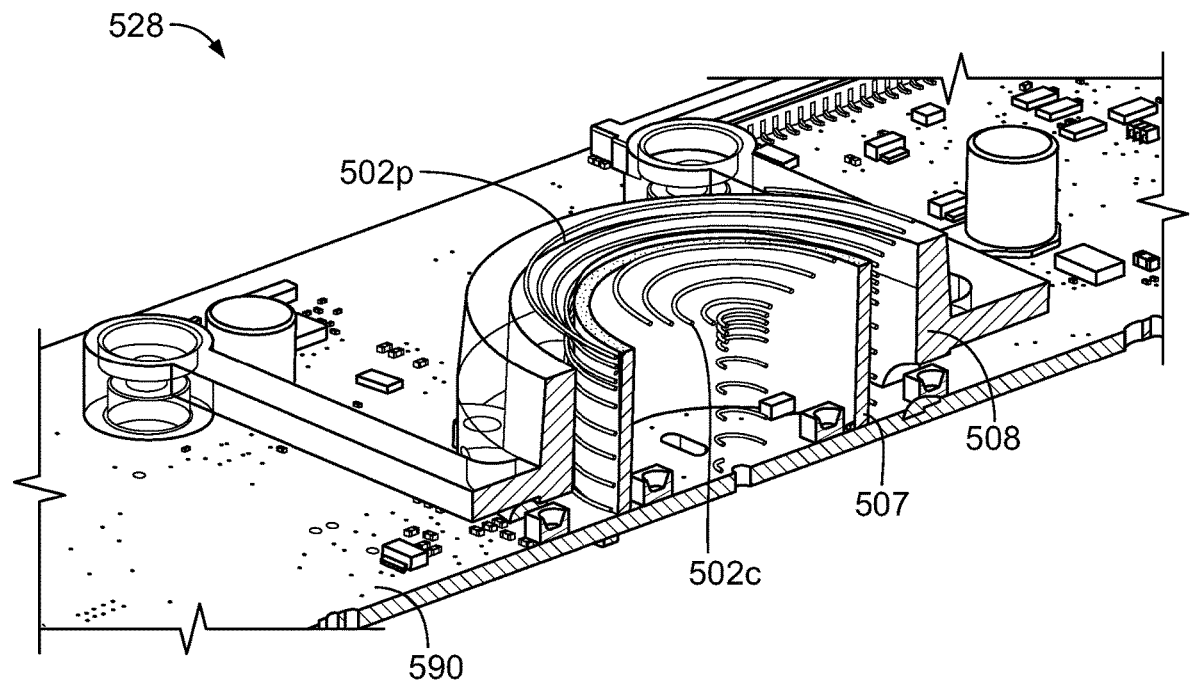
FIG. 5C is an internal cutaway view illustrating the arrangement and coupling of input elements of the user interface of FIG. 5A.
Figure 5D:
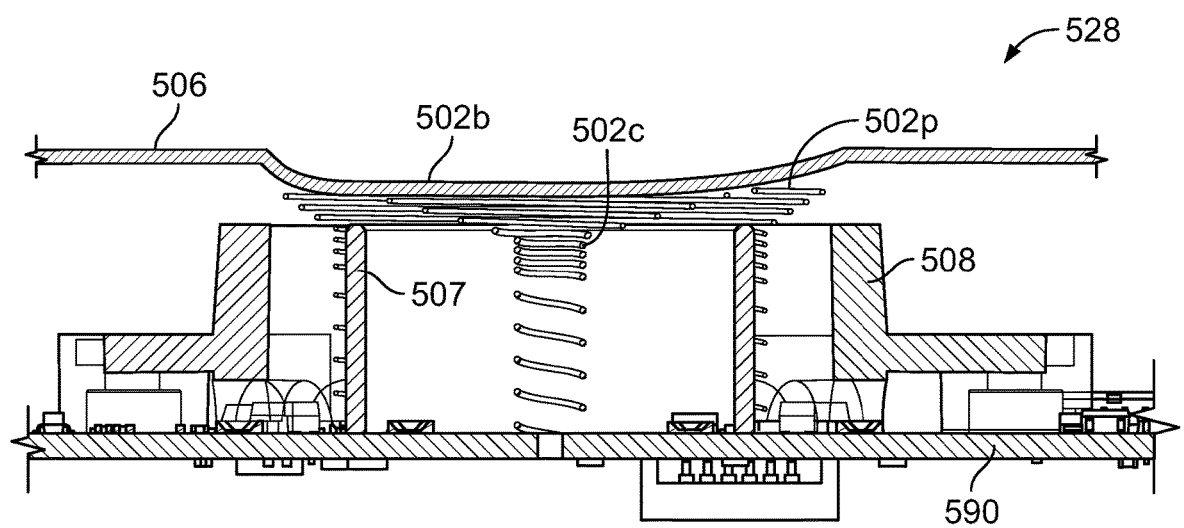
FIG. 5D is a cross-sectional view of the user interface of FIG. 5C.

As shown in the plan view of FIG. 5A, the internal perspective view of FIG. 5B, the cutaway perspective view of FIG. 5C, and the cross-section of FIG. 5D, an isolation ring 507 is provided between the outer capacitive sensor 502p and the inner capacitive sensor 502c. In the illustrated embodiments, the isolation ring 507 is implemented as a continuous insulating ring that separates the outer capacitive sensor 502p from the inner capacitive sensor 502p to prevent contact therebetween.

In further embodiments, an active guard element, such as the active guard element 607 described in greater detail below with reference to FIG. 6A, may be included around one or more of the input elements 502, 502', for example, as a conductive ring extending around the inner capacitive sensor 502c (e.g., instead of or in addition to the isolation ring 507), and/or respective conductive rings extending around one or more of the outer capacitive sensors 502p. In some embodiments, the outer coil spring-type capacitive sensor 502p itself may be selectively driven to function as an active guard element that concentrates the electric field lines in the area of the inner coil spring-type capacitive sensor 502c, that is, to function as both a button and an active guard.

The internal views of FIGS. 5B-5D further illustrate the arrangement and coupling of the conductive spring-type capacitive sensors 502c, 502p and other internal electrical components to a printed circuit board 590. A transmissive light pipe defines a light ring 508 around both the outer and inner capacitive sensors 502p and 502c of the central input element 502. One or more light emitting elements, such as light emitting diode(s), may be configured to illuminate the light ring 508 to display one or multiple colors of light, for example, where each color may indicate a respective operating status of the mobile robot. The isolation ring 507 may also reduce or prevent light bleed between the light ring 508 and other light emitting element(s), for example, additional light emitting diode(s) that may be configured to illuminate the central input element 502.

The input elements 502, 502' of the user interface 528, including the two concentric conical spring-type capacitive sensors 502p, 502c that are arranged one inside the other and separated by the isolation ring 507, may achieve the same or better performance (for example, in terms of consistent sensing/detection, contact area, false trigger avoidance, cost of parts, etc.) as compared to the peripheral sheet metal-spring capacitive sensors 402p surrounding the central conical spring capacitive sensor 402c of the central input element 402 of FIGS. 4A-4D.

As similarly described above with reference to FIGS. 4A-4D, the capacitive sensors 502c, 502p are likewise configured to generate respective detection signals 505 indicative of inputs received at the peripheral regions and the central region (including the sub regions thereof), based on the layout and arrangement of the associated input elements 502 and recessed wells 502b. The detection signals 505 are output via the printed circuit board 590 to an electronic control unit, such as the controller 220 of FIG. 2 or the computing device 320 of FIG. 3, which may selectively disregard inputs received at one or more of the regions based on the operating status of the mobile robot.

In the example embodiments of FIGS. 5A-5D, the control unit is configured to selectively disregard inputs at one or more of the peripheral capacitive sensors 502p, including inputs at edge portions (corresponding to the underlying peripheral capacitive sensor 502p) of the central input element 502, based on the operating status of the mobile robot, and may be configured to register an input at or near the center (corresponding to the location of the underlying central capacitive sensor 502c) of the central input element 502 independent or regardless of the operating status of the mobile robot. In an example where the mobile robot is a cleaning robot, the central input element 502 is a "CLEAN" button, and the peripheral input elements 502' are "HOME" and "SPOT" buttons, respectively, the control unit may selectively disregard inputs received at regions overlying the peripheral capacitive sensors 502p (e.g., at one or more of the "HOME" and/or "SPOT" buttons, and/or at a circumferential region defining an annulus around the center of the "CLEAN" button) during a cleaning mission, in a manner similar to that described above with reference to FIGS. 4A-4D, but embodiments described herein are not limited to this input element arrangement and/or control scheme.

As also similarly discussed above with reference to FIGS. 4A-4D, the recessed well 502b of the central input element 502 may be recessed by a different distance than one or more of the recessed wells 502b of the peripheral input elements 502' relative to the top surface 506 of the robot. The additional input precision imposed by the differing depths of the recessed wells 502b may be used in combination with the operations for selectively disregarding inputs described herein to further increase the threshold for detecting inputs at different regions of the user interface 528 based on the operating status of the mobile robot, so as to reduce detection of unintended inputs under operating conditions whereby spurious inputs may more frequently occur.

Figure 6A:
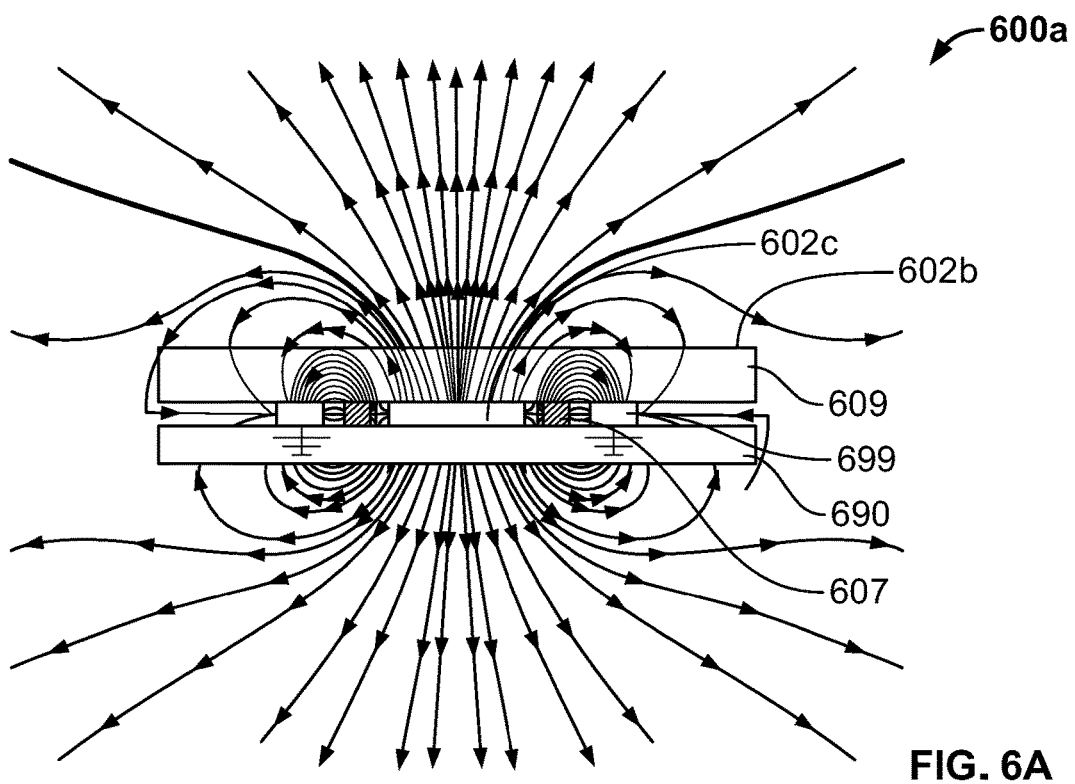
FIG. 6A is a cross-sectional view of an input element including active guard functionality according to some embodiments described herein.
Figure 6B:
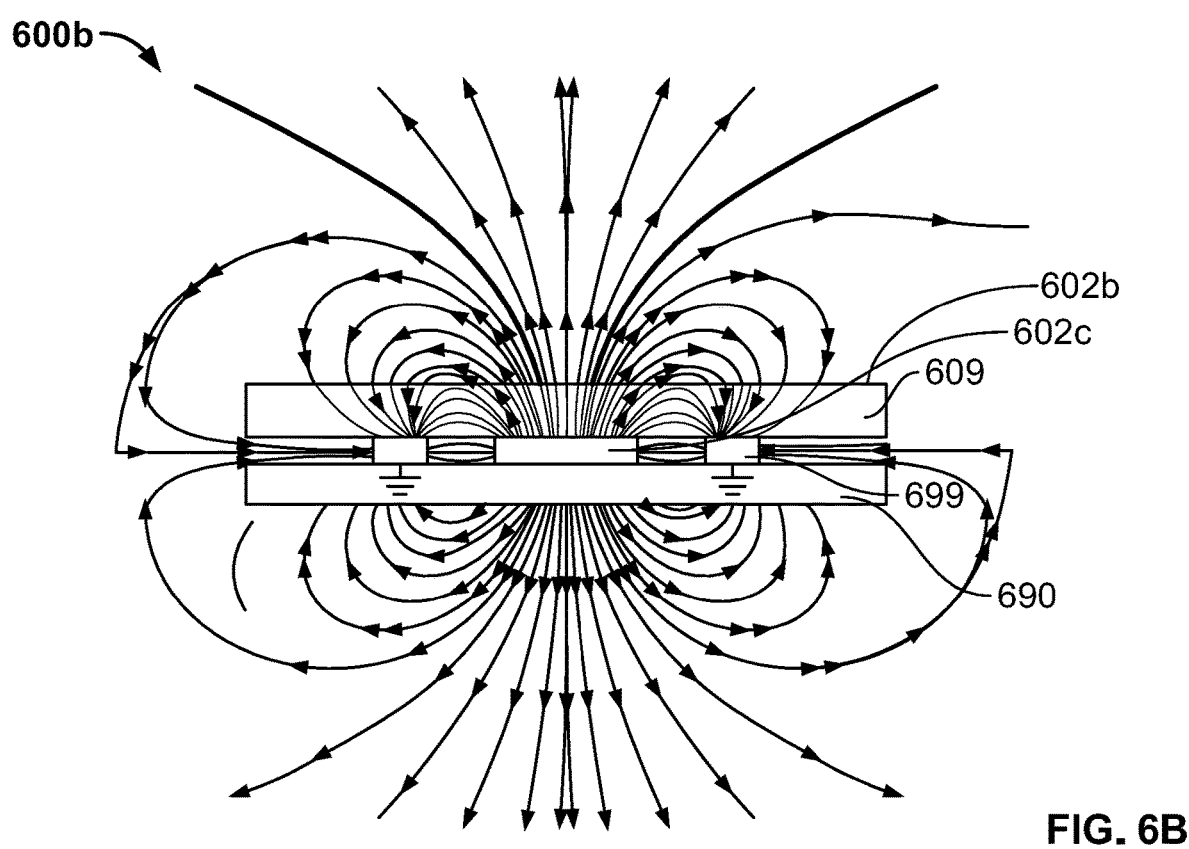
FIG. 6B is a cross-sectional view of an input element without active guard functionality according to some embodiments described herein.

FIGS. 6A and 6B are cross-sectional views illustrating electrical operation of input elements 600a and 600b including capacitive sensors (also referred to herein as touch pads) 602c in accordance with embodiments described herein. The input elements 600a, 600b may be used to implement any of the input elements 302, 402, 502, 702, and/or 802 described herein. The input element 600a includes an active guard element 607, while the input element 600b does not include an active guard element.

As shown in FIG. 6A, the active guard element 607 can be used to improve performance of the capacitive sensor 602c by altering a sensitivity or detection threshold of the capacitive sensor 602c to touch inputs. The active guard 607 may be implemented by a conductor adjacent a perimeter of and or surrounding the touch pad 602c of the input element 600a. The active guard 607 may extend between the touch pad 602c and other conductors on the robot, but not between the touch pad 602c and the user (e.g., the surface 602b of the insulation or dielectric element 609 opposite the touch pad 602c).

As shown in FIGS. 6A and 6B, a control unit (such as the controller 220 of FIG. 2 or the computing device 320 of FIG. 3) is configured to drive signals to the touch pad 602c, resulting in the flow of an electric field (shown by lines with arrows; also referred to as field lines) between the touch pad 602c and the ground 699 provided by the printed circuit board 690. In FIG. 6A, the control unit is also configured to drive a signal to the active guard 607. The signal applied to the active guard 607 is opposite in polarity to the signal applied to the touch pad 602c, which has the effect of shielding the touch pad 602c from other capacitors and concentrating the field lines towards the user (e.g., such that the field lines flow over a greater area of the surface 602b at which touch inputs from the user may be received). As compared to the density of the field lines shown in FIG. 6B, the field line density in FIG. 6A is higher or more concentrated in the area of the surface 602b surrounded by or otherwise within the perimeter or boundary of the active guard element 607 in plan view, and the added dielectric capacitance may thus be larger relative to areas of the surface 602b that extend beyond or otherwise outside the perimeter or boundary of the active guard element 607. That is, the use of the active guard 607 in FIG. 6A can increase the signal-to-noise ratio at a particular area of surface 602b, allowing for a lowering of the threshold for detection of touch inputs at the area of the surface 602b overlying a region bounded by the active guard element 607 (relative to areas of the surface 602b overlying regions outside the boundary of the active guard element 607).

The active guard element 607 of FIG. 6A may be applied to or implemented in any of the input elements 302, 402, 502, 702, and/or 802 described herein, for example, input elements including multiple capacitive sensors at or underlying respective subregions thereof. For instance, in the embodiments of FIGS. 5A-5D, an active guard element may be implemented as a conductive ring between the inner and outer capacitive sensors 502c and 502p (for example, in place of or in addition to the isolation ring 507) to increase the density of field lines in the area of the central input element 502 overlying the inner capacitive sensor 502c, and to reduce the density of field lines in the area of the central input element 502 overlying the outer capacitive sensor 502p. That is, when driven as an active guard element, the isolation ring 507 may be configured to increase the sensitivity/reduce the threshold for detection of inputs at the center region of the central input element 502, and to reduce the sensitivity/increase the threshold for detection of inputs at the circumference (or annulus around the center region) of the central input element 502, which may help reduce and/or minimize detection of hover touches and/or other spurious touch inputs. Active guard elements 607 as described herein may also be selectively driven by the control unit according to the operating status of the mobile robot, thereby actively increasing or decreasing detection thresholds at various regions of the input element under different robot operating conditions.

Figure 7A:
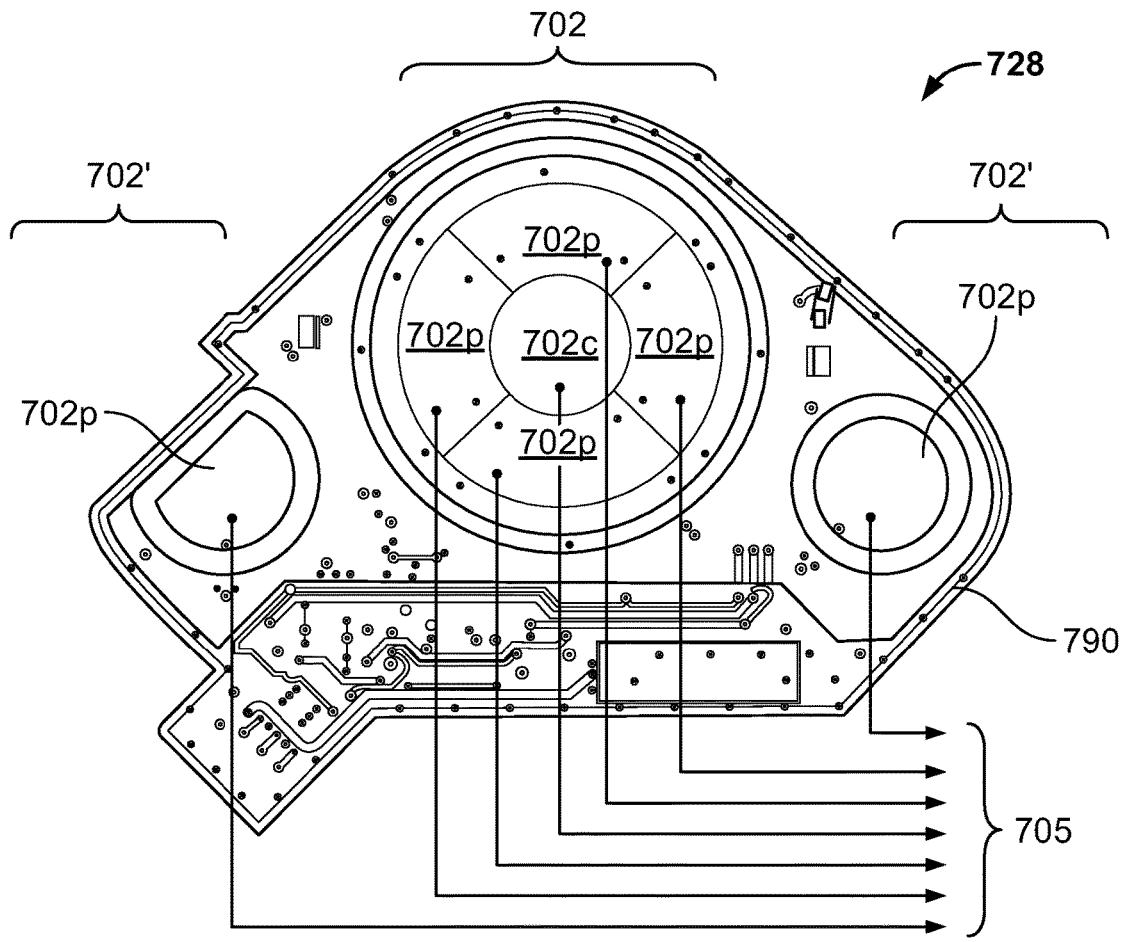
FIG. 7A is a plan view illustrating a user interface of a mobile robot according to some embodiments described herein.
Figure 7B:
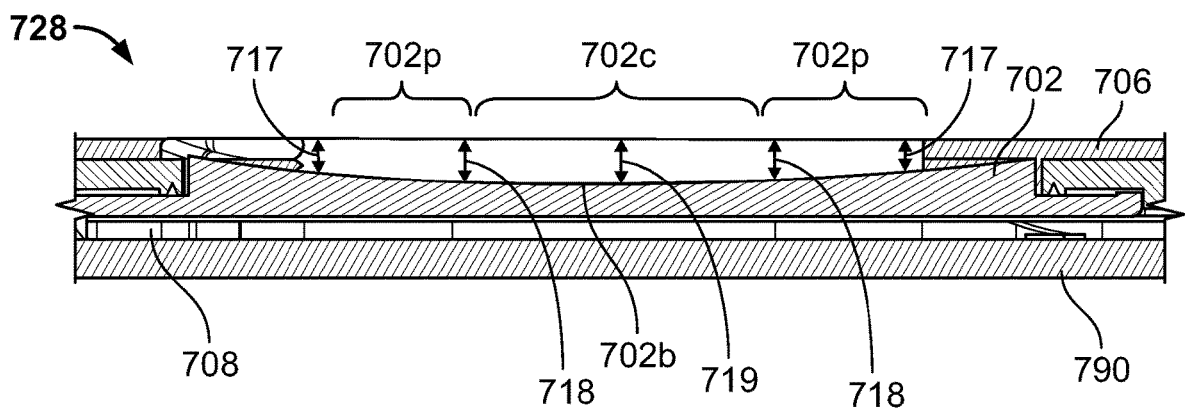
FIG. 7B is a cross-sectional view of the central input element of the user interface of FIG. 7A.

FIGS. 7A and 7B are plan and cross-sectional views, respectively, illustrating example embodiments of a user interface 728 including input elements 702, 702' implemented by conductive plate-type capacitive sensors 702c, 702p that are supported by a printed circuit board 790. As shown in FIGS. 7A and 7B, a mobile robot (such as the mobile robot 100, 200) may include user interface 728 adjacent an external surface 706 of the mobile robot. The input elements 702 include bottom surfaces/recessed wells 702b that are recessed relative to the top surface 706.

As shown in the plan view of FIG. 7A, one or more capacitive sensors 702c, 702p are provided below each of the recessed wells 702b. In particular, peripheral input elements 702' are defined by the two recessed wells 702b positioned at peripheral regions of the user interface 728, each of which includes a respective peripheral capacitive sensor 702p. As shown in the cross-section of FIG. 7B, a central input element 702 is defined by the recessed well 702b positioned at a central region of the user interface 728. The central input element 702 includes four peripheral capacitive sensors 402p defining an annulus around a central capacitive sensor 702c. The central input element 702 and the peripheral input elements 702 may each include a dished or concave bottom surface 702b by way of example, but it will be understood that the shapes (and/or combination of shapes) of these surfaces 702b are not limited to those shown, and that the bottom surfaces 702b may have dished and/or flat shapes in various combinations regardless of location of the input elements 702, 702' on the user interface 728 and/or the surface 706.

In FIG. 7A, the peripheral input elements 702' each include a respective conductive plate-type capacitive sensor 702p, while the central input element 702 is configured to receive inputs at multiple subregions corresponding to the multiple conductive plate-type capacitive sensors 702p arranged in an annulus that is split into four quadrants around the central conductive plate-type capacitive sensor 702c. The cross section of FIG. 7B likewise illustrates that the central input element 702 includes a central region defined by capacitive sensor 702c, with a peripheral regions defined by the four capacitive sensors 702p arranged as a four-quadrant annulus around the capacitive sensor 702c. For example, the central input element 702 may define a single physical button, with the underlying capacitive sensors 702c, 702p defining multiple subregions within the single button.

As similarly described with reference to FIGS. 4A-4D and 5A-5D, the capacitive sensors 702c, 702p are configured to generate respective detection signals 705 indicative of inputs received at the peripheral regions and the central region (including the sub regions thereof), based on the layout and arrangement of the associated input elements 702 and recessed wells 702b. The detection signals 705 are output via the printed circuit board 790 to an electronic control unit, such as the controller 220 of FIG. 2 or the computing device 320 of FIG. 3, which may selectively disregard inputs received at one or more of the regions based on the operating status of the mobile robot.

In some embodiments, the control unit is configured to selectively disregard inputs at one or more of the peripheral capacitive sensors 702p, including inputs received at the peripheral input elements 702' and edge portions of the central input element 702 (overlying the peripheral capacitive sensors 702p) based on the robot operating status, but to register inputs received at the center region of the central input element 702 (overlying the central capacitive sensor 702c) regardless or independent of the robot operating status. For example, where the mobile robot is a cleaning robot, the leftmost peripheral input element 702' shown in FIG. 7A may be a "HOME" button, the rightmost peripheral input element 702' may be a "SPOT" button, and the central input element 702 therebetween may be a "CLEAN" button. The control unit may selectively disregard inputs received at regions overlying the peripheral capacitive sensors 702p (e.g., at one or more of the "HOME" and/or "SPOT" buttons, and/or one or more of the four quadrants defining the annulus around the center of the "CLEAN" button) during a cleaning mission, in a manner similar to that described above with reference to FIGS. 4A-4D. In such an implementation, a cleaning mission in-progress may be paused only by an input received at a region overlying the central capacitive sensor 702c (e.g., at the center of the "CLEAN" button 702). However, it will be understood that embodiments described herein are not limited to this input element arrangement and/or control scheme.

In some embodiments, a conductive element may also be provided around a perimeter of one or more of these three buttons (or between one or more of the subregions of the "CLEAN" button) as an active guard element. Such an active guard/perimeter ring may be used to distinguish unintended touches as described above with reference to FIG. 6A. The active guard/perimeter ring may be implemented as a thin trace surrounding one or more (or all) of the buttons, to increase the sensitivity/reduce the threshold for detection of inputs in the surrounded area(s). For example, active guard elements surrounding one or more of the peripheral capacitive sensors 702p (defining annulus around the center of the "CLEAN" button and/or defining the "HOME" and "SPOT" buttons) may be selectively driven by the control unit responsive to determining that the robot is executing a cleaning mission or otherwise navigating in the operating environment, thereby reducing the threshold for detection of inputs at areas overlying the peripheral sensors 702p when the robot is moving. Such a control scheme could be used to distinguish a large conductor (such as a refrigerator door or lateral support beam between legs of a chair) that would pass laterally across regions overlying one or more of the peripheral capacitive sensors 702p before reaching the central capacitive sensor 702c) from human input (such as from a user's finger) that would vertically approach the region overlying the central capacitive sensor 702c. In some embodiments, the control unit may selectively deactivate one or more regions of the user interface 728 when the robot navigates under a large conductor to further avoid detection of unintended inputs when a large conductor is detected at one or more of the peripheral capacitive sensors 702p.

In the embodiments of FIGS. 7A and 7B, the printed circuit board 790 includes the conductive plate-type capacitive sensors 702c, 702p thereon. As shown in the cross-section of FIG. 7B, the capacitive sensors 702c, 702p are on a surface of the printed circuit board 790, without a ground beneath the sensors 702c, 702p. The printed circuit board 790 may include custom computer readable firmware code, which, in some embodiments, may be in assembly language to allow for faster reading by the control unit to aid noise rejection. FIG. 7B also illustrates a translucent light guide 708 between the bottom surface/recessed well 702b of the input element 702 (at which touch inputs may be received) and the underlying printed circuit board 790. The light guide 708 may configured to be illuminated with different colors (for example, by directing light from one or more LEDs towards a user) to indicate the operating status of the mobile robot, as discussed above.

As similarly discussed above with reference to FIGS. 4A-4D, the recessed well 702b of the central input element 702 may be recessed by a different distance than one or more of the recessed wells 702b of the peripheral input elements 702' relative to the top surface 706 of the robot. In the example of FIG. 7B, the bottom surface 702b of the central input element 702 is concave, and is recessed relative to the top surface 706 by distance of about 0.2 mm to about 2 mm (for example, 0.3 mm to 1.6 mm). In particular, the concave bottom surface 702b of the central input element 702 may be recessed relative to the top surface 706 by a distance of about 1.1 mm at the center 719 (corresponding to sensor 702c), and by a distance of about 0.5 mm to 0.94 mm at inner and outer edges 718 and 717 (corresponding to edges of the annulus overlying sensors 702p); however, the bottom surface 702b may have greater or lesser concavity (or may include multiple concave areas with differing depths) in some embodiments. The concave shape(s) of the bottom surface 702b can help ensure that external objects larger than the lateral diameter of the central input element 702 may not contact the underlying capacitive sensor 702c, where a larger depth range between the center 719 and the edges 718 and/or 717 may aid in distinguishing unintended touches. For example, a difference in depth between the outer edge 717 and the center 719 of the concave bottom surface 702b of the central input element 702 may be about 0.5 mm to 1.5 mm. The control unit may thus utilize a threshold for detection of an input at the center region of input element 702 (center button) that ignores objects greater than about 0.5 mm away, which may help reduce detection of flat metal objects and/or "hovering" (e.g., positioning a user's finger over but not touching the input element 702).

Figure 8A:
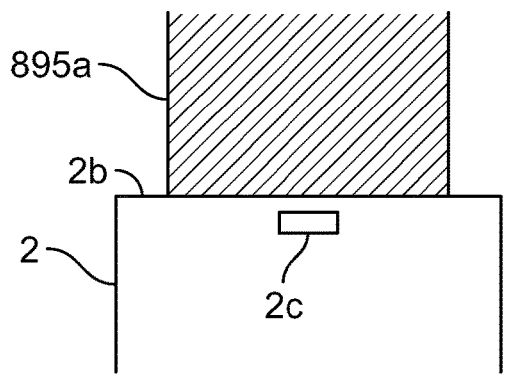
FIGS. 8A, 8B, and 8C are cross-sectional views illustrating detection of inputs in user interfaces including planar and concave input elements according to some embodiments described herein.
Figure 8A:
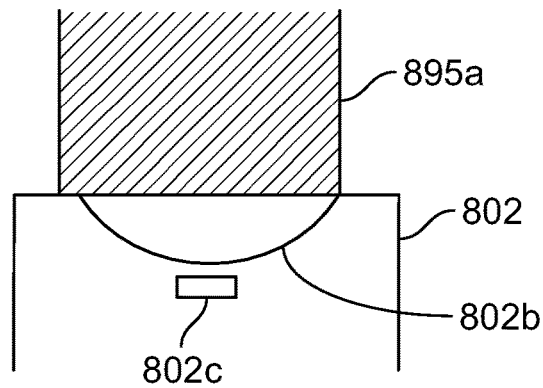
Figure 8B:
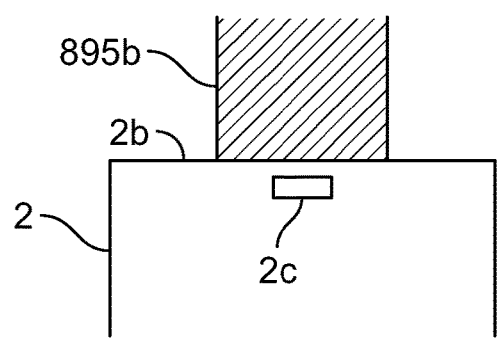
Figure 8B:
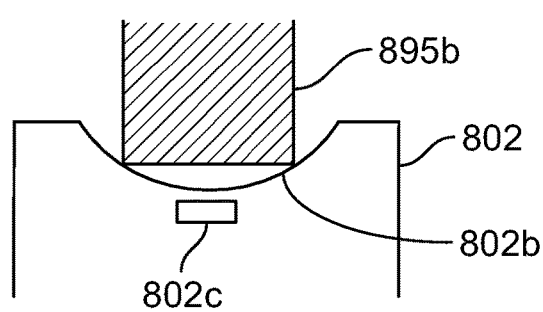
Figure 8C:
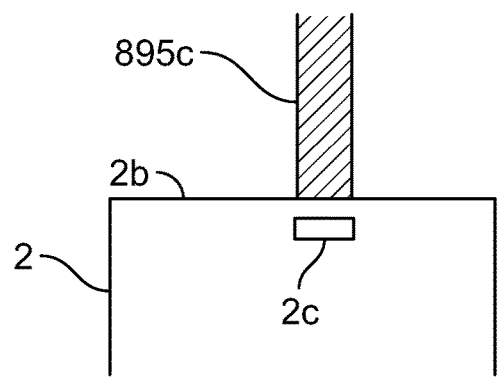
Figure 8C:
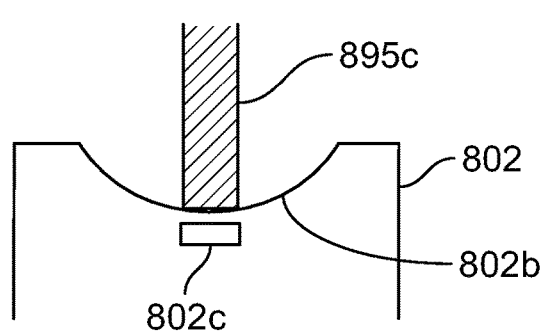

FIGS. 8A, 8B, and 8C are cross-sectional views illustrating detection of inputs in user interfaces including planar and concave contact surfaces for user input elements 2, 802 according to some embodiments described herein. As shown in FIGS. 8A-8C, in some embodiments, user input elements 2 and 802 may be recessed relative to a top surface of a mobile robot, such as the external cover of a mobile robot. As compared to the planar contact surface 2b of user input element 2, user input element 802 includes a recessed well 802b. In the example of FIGS. 8A-8C, the recessed well 802 has a dished or concave shape (which appears parabolic in cross-section), but it will be understood that the shape of the recessed well 802b is not so limited. The recessed contact surfaces 2b, 802b may define bottom surfaces of any of the embodiments described herein, for example, the bottom surfaces 402b, 502b, and/or 702b described above. As such, the user input elements 2, 802 may similarly include one or more electrical and/or mechanical sensor elements below the bottom surfaces 2b, 802b. Embodiments are discussed below with reference to capacitive sensors 2c, 802c that are positioned below central regions of the illustrated surfaces 2b, 802b by way of example only.

As shown in FIGS. 8A-8C, the recessed well 802b may require an additional degree of input precision that can be used, in combination with the underlying sensor element(s) 802c, to selectively disregard inputs based on the operating status of a mobile robot as described herein. That is, in comparison to the surface 2b, the recessed well 802b may be shaped so as to further aid the control unit coupled to the underlying capacitive sensor 802c (and the controller that receives the detection signal therefrom) in distinguishing unintended inputs by larger conductors 895a, 895b (which may represent elements in an operating environment under which the mobile robot may travel during navigation) from intended inputs by smaller conductors 895c (which may represent a human finger or other user input).

In particular, as shown in FIGS. 8A-8C, inputs received at the input element 2 by the conductors 895a, 895b, 895c all contact the central region of the surface 2b (which overlies the capacitive sensor 2c), and thus trigger the output of a detection signal therefrom regardless of a precision of the inputs. In contrast, as shown in FIGS. 8A and 8B, less precise inputs received at the input element 802 by the conductor 895a (which is larger than the diameter of the recessed well 802b) and the conductor 895b (which is smaller than the diameter of the recessed well 802b) do not trigger the output of a detection signal from the underlying capacitive sensor 802c, as the shape of the recessed well 802b prevents the conductors 895a, 895b from contact with the lowermost or central region of the recessed well 802b (which overlies the capacitive sensor 802c). However, as shown in FIG. 8C, a more precise input received at the input element 802 by the conductor 895c contacts the central region of the recessed well 802b, and thus, is detected by and triggers the output of a detection signal from the underlying capacitive sensor 802c. It will be understood that the input elements 2, 802 shown in FIGS. 8A-8C may include multiple underlying sensors (e.g., capacitive sensors underlying peripheral regions of the input elements 2, 802 in addition to the capacitive sensors 2c, 802c shown), and the inputs 895a-895c received at such peripheral regions may be likewise selectively detected or disregarded based on the operating status of the mobile robot in a manner similar to that discussed above with reference to FIGS. 4-7.

Possible detection states in detection operations in accordance with some embodiments described herein may include: a "true" state, where an input is intended; and a "false" state, where an input is unintended. With each of such possible states, there can also be two possible reactions of the input element: a "positive" state, where an input is registered, and a "negative" state, where an input is not registered. This can yield four conditions (true and false positive detection, true and false negative detection), as described below.

In particular, true positive detection may occur when a received input is intended, and the input is accurately registered. Quick timing and feedback may be desirable, particularly in embodiments including capacitive sensors that may not provide tactile feedback from a mechanism (e.g., sound and/or lights triggered in response to the input may be the only indications that the input has been registered). In contrast, true negative detection may occur when a received input is intended, but is not registered (e.g., failure to react to a valid input).

False negative detection may occur when no inputs are registered when no inputs are received (e.g., no detection of inputs when no inputs are intended). In contrast, false positive detection may occur when inputs are registered when the inputs are unintended, also described herein with reference to spurious touch inputs. Detection of such unintended inputs can be problematic for operation of a mobile robot. For example, if an unintended input is detected during a mission or other navigation of the operating environment by the mobile robot, this false positive detection can effectively strand the robot (if a user is not present to provide an input to resume operation) or even reboot the mobile robot, which may result in loss of information (for example, troubleshooting information).

Testing scenarios for the above conditions may include operating testing and service testing. Performance tests may include finger press, hover, metal overhang, and cable overhang. In some embodiments, input elements as described herein may be configured to output detection signals responsive to (but not limited to) direct contact from a fingertip (e.g., about 7 mm to 15 mm in diameter) or contact through a fabric having a thickness of up to about 1 mm, with a delay for response be within about 100 ms in a higher power mode, or about 250 ms in a lower power mode. Also, a touch input of about 0.25 Newtons for about 100 ms should be registered. In some embodiments, input elements as described herein may be configured not to output detection signals responsive to hovering inputs from a fingertip when separated by a distance of more than about 1 mm. In some embodiments, if the mobile robot is flipped upside down, input elements as described herein may be configured not to output detection signals, or such detection signals may be ignored by the control unit, based on the operating status.

Figure 9A:
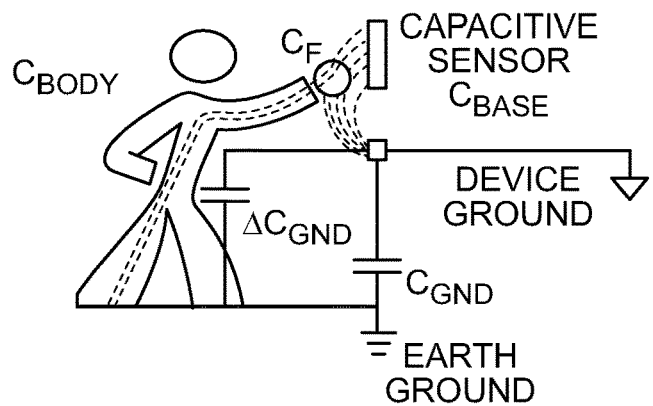
FIGS. 9A and 9B are circuit diagrams illustrating capacitance contributions of various elements in an operating environment according to some embodiments described herein.
Figure 9B:
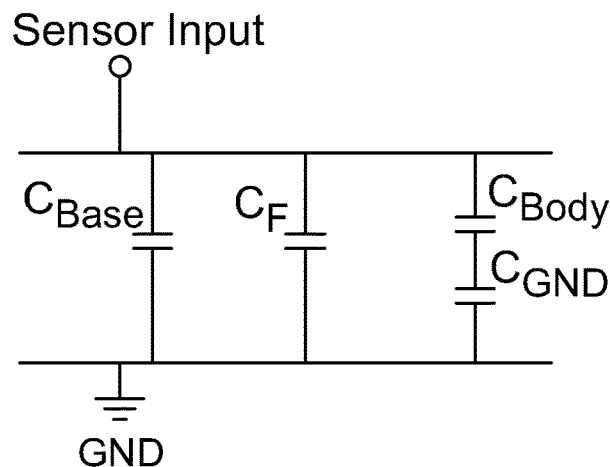
Figure 10:
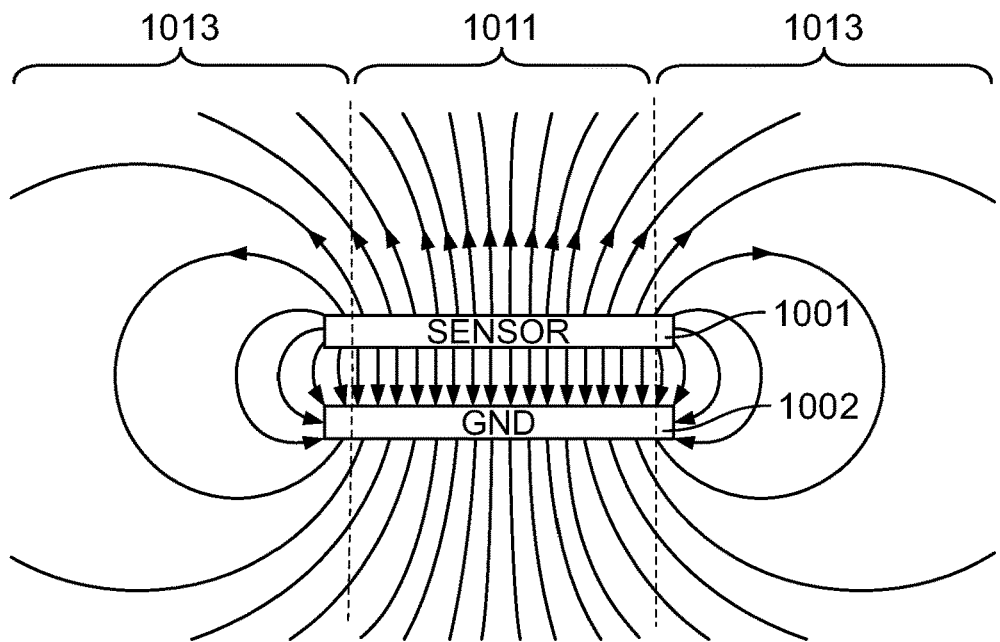
FIG. 10 is a cross-sectional view illustrating example operation of a capacitive sensor.

Example equivalent circuit diagrams illustrating the capacitance contributions internal to a robot, user dielectric effects, and additional effective capacitance of a user are illustrated in FIGS. 9A-9B. In particular, as shown in FIG. 9A, the capacitance measured by a capacitive sensor of a user interface associated with a mobile robot as described herein includes the base capacitance Cbase, plus the added capacitance Cf due to users and environment. In FIGS. 9A and 9B, Cbase refers to the inherent capacitance of the touchpad-device ground capacitor; Cf is the added capacitance due to the dielectric effect of the user in the electric field lines of Cbase; Cbody is the capacitance of the user to earth ground, Cgnd is the capacitance from the device ground to earth ground; and ΔCgnd is a representation of noise currents that can couple into the device ground. Such electrical noise in the operating environment can be reduced by filtering (for example, by filtering out very high frequency and low frequency signals, as changes in electric field due to intended inputs may typically occur over the order of 100 milliseconds (ms)). As the mobile robot may typically be isolated from the user's ground reference (e.g., by plastic, rubber wheels, etc.), the capacitive model described herein is based on an example where a user and a capacitive sensor do not share a ground, an equivalent circuit diagram for which is shown in FIG. 9B. Generally, the larger Cf and the smaller Cbase, the lower the threshold for detection. However, because noise can couple into an "open" capacitor and cause false detection, some embodiments described herein may be configured to increase the signal-to-noise ratio, such that the threshold to register a true touch can be reduced.

Some design characteristics in implementing capacitive sensors as described herein may recognize that a smaller touchpad may provide a smaller Cbase value, and thus the detected signal may be larger as a percentage change of capacitance. This may allow the detection threshold to be lowered and reject more noise and spurious touches. Also, the shorter the distance between the touchpad and the finger (e.g., thinner insulation, absence of gaps in the touchpad), the stronger the dielectric effect and the stronger the signal. Increasing the distance from the touchpad to sources of unintended touch inputs (e.g., bottoms of refrigerator doors) may also reduce their added capacitance and improve immunity to spurious touches, while the use of an active guard (as discussed above) may provide electric field concentration and increased sensitivity at subregions of the touchpad.

In some embodiments, the capacitance may be measured using a differential capacitive voltage divider, which may include alternately charging and discharging the touchpad and a reference capacitor having a capacitance similar to the capacitance Cbase of the touchpad. In particular, the touchpad may be separately charged to a rail voltage and the reference capacitor may be discharged, and the touchpad and the reference capacitor may be isolated and connected to one another and the resulting voltage may be measured. After measuring the resulting voltage, the polarity for charging may be switched such that the reference capacitor may be separately charged to the rail voltage and the touchpad may be discharged, and the touchpad and the reference capacitor may be isolated and connected to one another and the resulting voltage may again be measured. The two measured voltages may then be subtracted to indicate the measured capacitance, which may aid in rejection of common mode noise.

In the above-description of various embodiments of the present disclosure, aspects of the present disclosure may be illustrated and described herein in any of a number of patentable classes or contexts including any new and useful process, machine, manufacture, or composition of matter, or any new and useful improvement thereof. Accordingly, aspects of the present disclosure may be implemented in entirely hardware, entirely software (including firmware, resident software, micro-code, etc.) or combining software and hardware implementation that may all generally be referred to herein as a "circuit," "module," "component," or "system." Furthermore, aspects of the present disclosure may take the form of a computer program product comprising one or more computer readable media having computer readable program code embodied thereon.

Any combination of one or more computer readable media may be used. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a hard disk drive, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any non-transitory medium that can contain, or store a program for use by or in connection with an instruction execution system, apparatus, or device.

A computer readable signal medium may include a propagated data signal with computer readable information embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Computer readable information embodied on a computer readable signal medium (for example, as program code) may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages. The program code may execute entirely on a user terminal, a mobile robot, or a remote server described herein, or partly on one or more of each. In the latter scenario, the remote server may be connected to the user terminal and/or to the mobile robot through any type of network, including a local area network (LAN) or a wide area network (WAN), or the connection may be made to an external computer (for example, through the Internet using an Internet Service Provider) and/or in a cloud computing environment.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks. It should also be noted that, in some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

It is to be understood that the terminology used herein is for the purpose of describing particular embodiments only and is not intended to be limiting of the invention. Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of this specification and the relevant art and will not be interpreted in an idealized or overly formal sense unless expressly so defined herein.

Spatially relative terms, such as "under," "below," "lower," "over," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "under" or "beneath" other elements or features would then be oriented "over" the other elements or features. Thus, the example term "under" can encompass both an orientation of over and under. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein the expression "and/or" includes any and all combinations of one or more of the associated listed items.

A "mobile robot" may refer to any device including a processor, memory, and drive system for navigating variable environment conditions and making autonomous decisions based on a plurality of sensor inputs. Mobile robots as described herein, may include robot cleaners (such as iRobot® ROOMBA®, BRAAVA®, and/or BRAAVA Jet™ cleaners). A "communication signal" may refer to any signal transmitted by a network-enabled electronic device. Such electronic devices may include a processor, memory, and a transmitter and/or receiver for communication via a wireless personal, local, and/or wide area network, and may include, but are not limited to, Internet-of-Things (IoT) devices. Wireless communication signals may include radio frequency signals, including but not limited to Wi-Fi signals, Bluetooth signals, and/or optical signals.

The foregoing is illustrative of embodiments of the present disclosure and is not to be construed as limiting thereof. Although a few example embodiments have been described, those skilled in the art will readily appreciate that many modifications are possible in the example embodiments without materially departing from the teachings and advantages of this invention. Accordingly, all such modifications are intended to be included within the scope of this invention. Therefore, it is to be understood that the foregoing is illustrative of the present invention and is not to be construed as limited to the specific embodiments disclosed, and that modifications to the disclosed embodiments, as well as other embodiments, are intended to be included within the scope of the invention.

That which is claimed:

1. A mobile robot, comprising:
   a recessed well in a top surface of the mobile robot;
   at least one capacitive sensor underlying the recessed well, the at least one capacitive sensor comprising a first region and a second region;
   one or more mobility sensors; and
   a controller coupled to the at least one capacitive sensor and the one or more mobility sensors, wherein the controller is configured to perform operations comprising:
      determining an operating status of the mobile robot responsive to output signals from the one or more mobility sensors; and
      selectively disregarding an input at a first portion of the recessed well corresponding to the first region of the at least one capacitive sensor based on the operating status of the mobile robot.

2. The mobile robot of claim 1, wherein the selectively disregarding further comprises:
   registering an input at a second portion of the recessed well corresponding to the second region of the at least one capacitive sensor independent of the operating status of the mobile robot.

3. The mobile robot of claim 1, wherein the first portion of the recessed well corresponding to the first region comprises a peripheral region that defines a perimeter around a second portion of the recessed well corresponding to the second region.

4. The mobile robot of claim 1, further comprising:
   peripheral recessed wells in the top surface of the robot adjacent the recessed well; and
   peripheral capacitive sensors coupled to the controller and underlying the peripheral recessed wells, respectively, wherein the selectively disregarding further comprises:
   selectively disregarding respective inputs at the peripheral recessed wells based on the operating status of the mobile robot.

5. The mobile robot of claim 1, wherein the at least one capacitive sensor is configured to generate a detection signal indicative of the input at the first portion of the recessed well corresponding to the first region thereof, and wherein the selectively disregarding further comprises:
   detecting the input based on the detection signal from the at least one capacitive sensor; and
   identifying the input as unintended based on a characteristic of the detection signal.

6. The mobile robot of claim 5, wherein the characteristic of the detection signal comprises a time duration of the input, a capacitance, and/or a temporal change in an electric field indicated by the detection signal.

7. The mobile robot of claim 5, wherein the selectively disregarding further comprises altering a threshold for the detecting of the input according to the operating status.

8. The mobile robot of claim 1, further comprising:
   an active guard comprising a conductive element extending around the first region and/or the second region of the at least one capacitive sensor.

9. The mobile robot of claim 1, wherein the at least one capacitive sensor comprises first and second conductive spring-type capacitors comprising the first and second regions, respectively.

10. The mobile robot of claim 9, wherein the first and second conductive spring-type capacitors have a concentric arrangement and are separated by an isolation ring therebetween.

11. The mobile robot of claim 1, wherein the selectively disregarding comprises altering operation of the at least one capacitive sensor to detect the input according to the operating status.

12. The mobile robot of claim 1, wherein the recessed well is recessed relative to the top surface of the mobile robot by a distance of between about 0.2 millimeters (mm) to about 2 mm.

13. The mobile robot of claim 1, wherein the recessed well has a concave shape, and wherein the selectively disregarding is further based on the precision of the input relative to a center of the recessed well.

14. The mobile robot of claim 1, wherein the operating status of the mobile robot indicates navigation of an operating environment or absence of a load at wheels of the mobile robot.

15. The mobile robot of claim 1, further comprising a wireless communication interface coupled to the controller, and wherein the selectively disregarding is responsive to receiving a signal via the wireless communication interface.

16. A method of operating a mobile robot, the method comprising:
   executing, by at least one processor, computer readable instructions stored in a non-transitory computer readable storage medium to perform operations comprising:
      receiving an input at a first portion of a recessed well in a top surface of the mobile robot, the first portion of the recessed well corresponding to a first region of at least one capacitive sensor underlying the recessed well and comprising the first region and a second region;
      determining an operating status of the mobile robot responsive to output signals from one or more mobility sensors of the mobile robot; and
      selectively disregarding the input at the first portion of the recessed well corresponding to the first region of the at least one capacitive sensor based on the operating status of the mobile robot.

17. The method of claim 16, wherein the selectively disregarding further comprises:
   registering an input at a second portion of the recessed well corresponding to the second region of the at least one capacitive sensor independent of the operating status of the mobile robot,
   wherein the first portion of the recessed well corresponding to the first region comprises a peripheral region that defines a perimeter around the second portion of the recessed well corresponding to the second region.

18. The method of claim 16, further comprising:
   selectively disregarding respective inputs at peripheral recessed wells in the top surface of the robot adjacent the recessed well based on the operating status of the mobile robot, the peripheral recessed wells having peripheral capacitive sensors underlying the peripheral recessed wells, respectively.

19. The method of claim 16, wherein the at least one capacitive sensor is configured to generate a detection signal indicative of the input at the first portion of the recessed well corresponding to the first region thereof, and wherein the selectively disregarding further comprises:

detecting the input based on the detection signal from the at least one capacitive sensor; and identifying the input as unintended based on a characteristic of the detection signal.

20. The method of claim 19, wherein the selectively disregarding further comprises altering a threshold for the detecting of the input according to the operating status.

\* \* \* \* \*